(12) United States Patent
Kosaka et al.

(10) Patent No.: US 11,414,305 B2
(45) Date of Patent: Aug. 16, 2022

(54) MEASUREMENT TARGET TOP-SURFACE ESTIMATION METHOD, GUIDE INFORMATION DISPLAY DEVICE, AND CRANE

(71) Applicants: TADANO LTD., Kagawa (JP); THE SCHOOL CORPORATION KANSAI UNIVERSITY, Osaka (JP)

(72) Inventors: Takayuki Kosaka, Kagawa (JP); Iwao Ishikawa, Kagawa (JP); Satoshi Kubota, Osaka (JP); Shigenori Tanaka, Osaka (JP); Kenji Nakamura, Osaka (JP); Yuhei Yamamoto, Osaka (JP); Masaya Nakahara, Osaka (JP)

(73) Assignees: TADANO LTD., Kagawa (JP); THE SCHOOL CORPORATION KANSAI UNIVERSITY, Osaka (JP)

( * ) Notice: Subject to any disclaimer, the term of this patent is extended or adjusted under 35 U.S.C. 154(b) by 374 days.

(21) Appl. No.: 16/632,731

(22) PCT Filed: Jul. 19, 2018

(86) PCT No.: PCT/JP2018/027087
§ 371 (c)(1),
(2) Date: Jan. 21, 2020

(87) PCT Pub. No.: WO2019/017430
PCT Pub. Date: Jan. 24, 2019

(65) Prior Publication Data
US 2021/0147193 A1    May 20, 2021

(30) Foreign Application Priority Data
Jul. 21, 2017    (JP) .............................. JP2017-142193

(51) Int. Cl.
*B66C 13/46* (2006.01)
*G06T 7/521* (2017.01)
(Continued)

(52) U.S. Cl.
CPC .............. *B66C 13/46* (2013.01); *B66C 13/16* (2013.01); *G01B 11/14* (2013.01); *G06T 7/521* (2017.01);
(Continued)

(58) Field of Classification Search
CPC ......... B66C 13/46; B66C 13/16; B66C 13/00; G01B 11/14; G01B 11/22; G01B 11/026;
(Continued)

(56) References Cited

U.S. PATENT DOCUMENTS

2013/0218472 A1    8/2013    Fu et al.
2015/0206023 A1    7/2015    Kochi et al.
2022/0040860 A1*   2/2022    Cristache ............... B25J 9/1635

FOREIGN PATENT DOCUMENTS

CN    103500329 A    1/2014
EP    2327652 A1     6/2011
(Continued)

OTHER PUBLICATIONS

Sep. 23, 2021, Chinese Office Action issued for related CN Application No. 202010690132.7.
(Continued)

*Primary Examiner* — Diane D Mizrahi
(74) *Attorney, Agent, or Firm* — Paratus Law Group, PLLC

(57) ABSTRACT

To estimate the top surface of a measurement target on the basis of a data point group that corresponds to the top surface of the measurement target and is obtained using a laser scanner. A data processing unit: selects two data points from the data point group which is contained within the
(Continued)

thickness in the vertical direction of a hoisting load region, and calculates the distance between the selected two data points; determines the two data points are located in the same plane and calculates the gravitational center for each point determined to be in the same plane when the distance between the two points is equal to or less than a threshold; searches for a nearby point which is a data point for which the distance from the gravitational centers is equal to or less than the threshold, determines the nearby point is also in the same plane when the nearby point is discovered, and repeatedly performs the process in order each time a nearby point is discovered; obtains multiple data points determined to be in the same plane; and estimates plane clusters representing the top surfaces of a hoisting load and an object on the basis of the multiple data points.

7 Claims, 30 Drawing Sheets

(51) Int. Cl.
  *B66C 13/16* (2006.01)
  *G01B 11/14* (2006.01)
  *G01B 11/22* (2006.01)
(52) U.S. Cl.
  CPC .... *G01B 11/22* (2013.01); *G06T 2207/10028* (2013.01)
(58) Field of Classification Search
  CPC ......... G01B 11/24; G01B 11/02; G01B 11/00; G06T 7/521; G06T 2207/10028; G06T 7/11; G06T 7/136; G06T 7/187; G06T 17/10; G06T 19/00; G01C 1/00
  See application file for complete search history.

(56) References Cited

FOREIGN PATENT DOCUMENTS

| | | |
|---|---|---|
| EP | 2543622 A1 | 1/2013 |
| JP | 2014-186565 A | 10/2014 |
| JP | 2014-186566 A | 10/2014 |
| JP | 2014-186567 A | 10/2014 |
| JP | 2017-096840 A | 6/2017 |

OTHER PUBLICATIONS

Aug. 28, 2018, International Search Report issued for related PCT Application No. PCT/JP2018/027087.
Aug. 28, 2018, International Search Opinion issued for related PCT Application No. PCT/JP2018/027087.
Kawano et al., Research Concerning Technologies for Generating 3D Model of River Space Using Laser Profiler Data, Information Processing Society of Japan, Mar. 2015, pp. 55-72, vol. 8, No. 1.
Apr. 12, 2022, European Communication issued for related EP Application No. 20209999.0.
Jochem et al., Area-wide roof plane segmentation in airborne LiDAR point clouds, Computers, Environment and Urban Systems, May 4, 2011, pp. 54-64, Elsevier.

* cited by examiner

CROSS-SECTION ALONG A-A

MEASUREMENT TARGET TOP-SURFACE ESTIMATION METHOD, GUIDE INFORMATION DISPLAY DEVICE, AND CRANE

CROSS REFERENCE TO PRIOR APPLICATION

This application is a National Stage Patent Application of PCT International Patent Application No. PCT/JP2018/027087 (filed on Jul. 19, 2018) under 35 U.S.C. § 371, which claims priority to Japanese Patent Application No. 2017-142193 (filed on Jul. 21, 2017), which are all hereby incorporated by reference in their entirety.

TECHNICAL FIELD

The present invention relates to a technology related to a top surface estimation method for a measurement target object, a guide information display apparatus that uses the method, and a crane including the guide information display apparatus.

BACKGROUND ART

Conventionally, there is known a technique of acquiring a three-dimensional shape of a measurement target object on the basis of point cloud data of the measurement target object acquired by a laser scanner. Such a technique is disclosed in Patent Literatures (hereinafter, abbreviated as "PTL(s)") 1 to 3 below, for example.

As techniques for creating a three-dimensional map three-dimensionally expressing the shape of a grounded object as a measurement target object, PTLs 1 to 3 disclose techniques related to a three-dimensional point cloud analysis method of analyzing a three-dimensional point cloud expressing the shapes of a plurality of grounded objects and the like. According to the three-dimensional point cloud analysis methods described in PTLs 1 to 3, first, three-dimensional point cloud data is prepared, the three-dimensional point cloud data expressing outer shapes of a plurality of grounded objects, and including position coordinates in a three-dimensional coordinate space set for analysis and a normal vector of a plane where a point is estimated to exist. Then, principal component analysis is performed on the three-dimensional point cloud data to determine a provisional gravity direction, and a side surface point cloud is extracted by excluding points with normal vectors that are along the provisional gravity direction. Furthermore, points with small inter-point distances are grouped to separate point clouds on a building basis, and a side surface of each building is determined. A gravity direction is determined by determining, by principal component analysis, a normal vector for each side surface obtained in such a manner, and by taking a weighted average of outer products of the normal vectors.

According to the three-dimensional point cloud analysis methods described in PTLs 1 to 3, a side surface of each building is determined by a statistical method of principal component analysis, by using wide-region three-dimensional point cloud data expressing a plurality of grounded objects.

CITATION LIST

Patent Literature

PTL 1
Japanese Patent Application Laid-Open No. 2014-186565
PTL 2
Japanese Patent Application Laid-Open No. 2014-186566
PTL 3
Japanese Patent Application Laid-Open No. 2014-186567

SUMMARY OF INVENTION

Technical Problem

Conventional techniques described in PTLs 1 to 3 are techniques for creating a three-dimensional map from point cloud data that is acquired by attaching a laser scanner to an airplane or the like and flying in the air, and thus, point cloud data corresponding to side surfaces of a measurement target object is acquired, and a three-dimensional shape including a top surface of the measurement target object is determined on the basis of the point cloud data. In the case of acquiring point cloud data corresponding to side surfaces of a measurement target object, measurement is desirably performed several times while changing a measurement direction; however, in a case where measurement target objects are present close to each other, point cloud data corresponding to a side surface of a measurement target object is possibly not well acquired from the sky.

Accordingly, although the conventional techniques described in PTLs 1 to 3 enable estimation of a top surface of a measurement target object, calculation for estimating the top surface is complex, and also, acquisition of point cloud data is burdensome.

On the other hand, point cloud data corresponding to a top surface of a measurement target object can be reliably acquired by performing measurement from the sky approximately once, and thus, development of a technology that enables estimation of a top surface of a measurement target object by using only the point cloud data corresponding to the top surface of the measurement target object is desired.

The present invention has been made in view of such conventional problems, and an object of the present invention is to provide a top surface estimation method for a measurement target object that enables estimation of a top surface of a measurement target object on the basis of point cloud data corresponding to the top surface of the measurement target object acquired by a laser scanner, and a guide information display method and a crane that use the method.

Solution to Problem

The problems to be solved by the present invention are as described above. Next, means for solving the problems will be described.

More specifically, a top surface estimation method for a measurement target object according to the present invention includes: by a data processing section that performs arithmetic processing on point cloud data, a two-point selection step of extracting the point cloud data included within a predetermined thickness of a region in a vertical direction, from the point cloud data, acquired by a laser scanner from above a measurement target object, of the region including the measurement target object, and selecting two points from the point cloud data extracted; an inter-point distance calculation step of calculating an inter-point distance between the two points; a two-points-on-plane deeming step of deeming the two points to be two points that are on a same plane, in a case where the inter-point distance calculated is at or smaller than a predetermined threshold; a center-of-gravity calculation step of calculating a center of gravity of points that are deemed to be on the same plane; a neighboring point search step of searching for a neighboring point that is a point, a distance of which to the center of gravity is at or smaller than the threshold; and a neighboring-point-on-plane deeming step of deeming, when the neighboring point is found, that the neighboring point is a point that is on the same plane as the points that are deemed to be on the same plane, in which the center-of-gravity calculation step, the neighboring point search step, and the neighboring-point-on-plane deeming step are repeated in an order mentioned every time the neighboring point is detected, a plurality of points that are deemed to be on the same plane are acquired, and a top surface of the measurement target object is estimated based on the plurality of points.

According to the top surface estimation method for a measurement target object having such a configuration, the top surface of a measurement target object may be estimated on the basis of point cloud data corresponding to the top surface of the measurement target object acquired by the laser scanner. In this case, the top surface may be estimated in a short time, and thus, estimation of the top surface of a measurement target object in real time is enabled.

Moreover, in the top surface estimation method for a measurement target object according to the present invention, the data processing section estimates a width of the top surface from an inter-point distance between two points that are most separate in a width direction of the top surface, among the plurality of points that are deemed to be on the same plane, and estimates a depth of the top surface from an inter-point distance between two points that are most separate in a depth direction of the top surface, among the plurality of points that are deemed to be on the same plane.

According to the top surface estimation method for a measurement target object having such a configuration, a width and a depth of a top surface may be easily estimated on the basis of point cloud data corresponding to the top surface of a measurement target object acquired by the laser scanner.

Further, a guide information display apparatus according to the present invention includes: a data acquisition section that includes a camera that takes an image of a region including at least a measurement target object and a ground surface, from above the measurement target object, and a laser scanner that acquires point cloud data from the region, from above the measurement target object; the data processing section that estimates a top surface of the measurement target object and a top surface of a grounded object existing around the measurement target object based on the point cloud data acquired by the laser scanner of the data acquisition section, and that creates guide frames enclosing the top surface of the measurement target object and the top surface of the grounded object, respectively; and a data display section that displays guide information in which the guide frames created by the data processing section and the image taken by the camera are superimposed with each other, in which the data processing section extracts the point cloud data included within a predetermined thickness of a region in a vertical direction, from the point cloud data of the region including the measurement target object, selects two points from the point cloud data extracted; calculates an inter-point distance between the two points; deems the two points to be two points that are on a same plane, in a case where the inter-point distance calculated is at or smaller than a predetermined threshold, calculates a center of gravity of points that are deemed to be on the same plane, searches for a neighboring point that is a point, a distance of which to the center of gravity is at or smaller than the threshold, deems, when the neighboring point is found, that the neighboring point is a point that is on the same plane as the points that are deemed to be on the same plane, and repeats calculation of the center of gravity, search for the neighboring point, and deeming of the neighboring point as a point that is on the same plane in an order mentioned every time the neighboring point is detected, acquires a plurality of points that are deemed to be on the same plane, and estimates the top surface of the measurement target object based on the plurality of points.

With the guide information display apparatus having such a configuration, the top surface of a measurement target object may be estimated on the basis of point cloud data corresponding to the top surface of the measurement target object acquired by the laser scanner.

In the guide information display apparatus according to the present invention, the data processing section estimates a width of the top surface from an inter-point distance between two points that are most separate in a width direction of the top surface, among the plurality of points that are deemed to be on the same plane, and estimates a depth of the top surface from an inter-point distance between two points that are most separate in a depth direction of the top surface, among the plurality of points that are deemed to be on the same plane.

With the guide information display apparatus having such a configuration, a width and a depth of a top surface may be easily estimated on the basis of point cloud data corresponding to the top surface of a measurement target object acquired by the laser scanner.

A crane according to the present invention includes the guide information display apparatus according to claim 3 or 4.

With the crane having such a configuration, the top surface of a measurement target object may be estimated on the basis of point cloud data corresponding to the top surface of the measurement target object acquired by the laser scanner.

Advantageous Effects of Invention

Advantageous effects of the present invention are as follows.

With the top surface estimation method for a measurement target object, the guide information display apparatus, and the crane according to the present invention, the top surface of a measurement target object may be estimated on the basis of point cloud data corresponding to the top surface of the measurement target object acquired by a laser scanner.

BRIEF DESCRIPTION OF DRAWINGS

FIG. 5A is a schematic diagram along a Z-axis direction, and FIG. 5B is a schematic diagram along an X-axis direction;

FIG. 6A is a schematic diagram along the X-axis direction, and FIG. 6B is a schematic diagram along a Y-axis direction;

FIG. 7A is an upward view along the Y-axis direction, and FIG. 7B is a cross-section along A-A in FIG. 7A;

FIG. 8A is a diagram illustrating a data display section displaying image M, and FIG. 8B is a diagram illustrating the data display section displaying image M and guide information GD in an overlapping manner;

FIG. 9A illustrates a case where a data processing section, the data display section and a data input section are configured by a tablet PC, and FIG. 9B illustrates a case where the data display section and the data input section are configured by a touch panel display apparatus;

FIG. 13A is a diagram illustrating the point cloud data plotted in an XYZ coordinate system, and FIG. 13B is a diagram illustrating the point cloud data plotted in the XYZ coordinate system being grouped into a plurality of groups;

FIG. 15A is a diagram illustrating the calculation method of the reference height, and FIG. 15B is a schematic diagram illustrating a divided state of the suspended load region;

FIG. 26A illustrates a case of a grounded object of a first example, and FIG. 26B illustrates a case of a grounded object of a second example;

FIG. 28A illustrates a case of an all-enclosing same-region cluster, FIG. 28B illustrates a case where a planar cluster with a greatest elevation value is set as a different same-region cluster, and FIG. 28C illustrates a case where a different same-region cluster is set, the same-region cluster including all of planar clusters for which a difference in the elevation value is equal to or greater than a threshold;

DESCRIPTION OF EMBODIMENTS

Next, an embodiment of the invention will be described.

Figure 1:
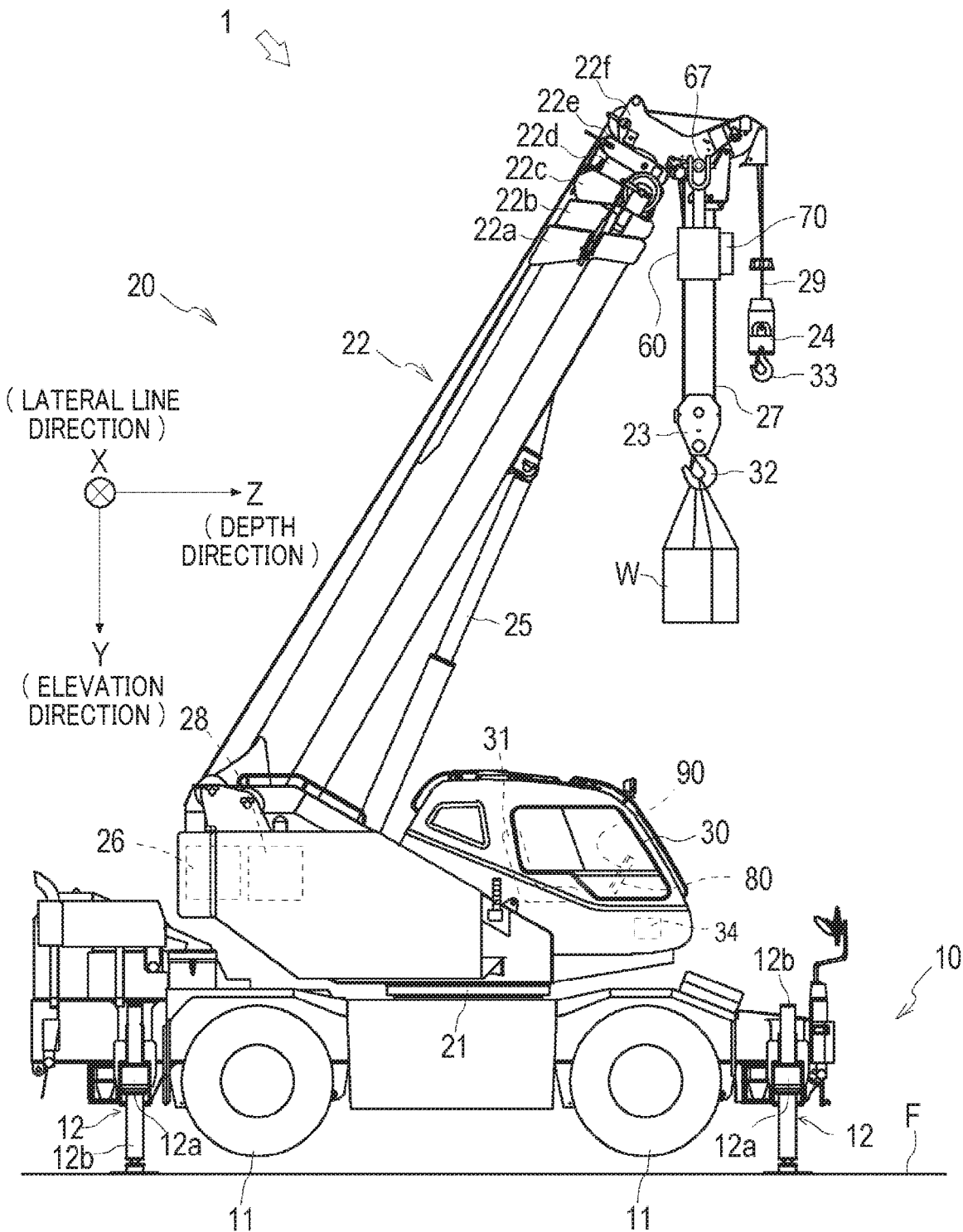
FIG. 1 is a schematic diagram illustrating an overall configuration of a crane according to an embodiment of the present invention.

As illustrated in FIG. 1, crane 1 is an example of a crane including a guide information display apparatus according to an embodiment of the present invention, and is a mobile crane that can be moved to a desired location.

Crane 1 includes traveling vehicle 10 and crane apparatus 20.

Traveling vehicle 10 is for transferring crane apparatus 20, and includes a plurality of wheels 11 (four, in the present embodiment), and performs traveling using an engine (not illustrated) as a power source.

Outrigger 12 is provided at four corners of traveling vehicle 10. Outrigger 12 is structured from overhang beam 12a that can be extended, by hydraulic pressure, to both sides in a width direction of traveling vehicle 10, and hydraulic jack cylinder 12b that can be extended in a direction perpendicular to the ground. Traveling vehicle 10 may place crane 1 in a workable state by grounding jack cylinder 12b, and may increase a workable range (a working radius) of crane 1 by increasing an extension length of overhang beam 12a.

Crane apparatus 20 lifts suspended load W with a wire rope, and includes swivel base 21, telescopic boom 22, main hook block 23, sub-hook block 24, luffing cylinder 25, main winch 26, main wire rope 27, sub-winch 28, sub-wire rope 29, and cabin 30.

Swivel base 21 enables crane apparatus 20 to swivel around, and is provided on a frame of traveling vehicle 10 through an annular bearing. The annular bearing is disposed with a rotation center being perpendicular to an installation surface of traveling vehicle 10. Swivel base 21 is capable of rotating in one direction and the other direction with a center of the annular bearing as a rotation center. Furthermore, swivel base 21 is rotated by a hydraulic rotation motor (not illustrated).

Telescopic boom 22 supports a wire rope such that suspended load W can be lifted. Telescopic boom 22 is made up of a plurality of boom members including base boom member 22a, second boom member 22b, third boom member 22c, fourth boom member 22d, fifth boom member 22e, and top boom member 22f The boom members are inserted in a nested structure in the order of the size of cross-sectional area. Telescopic boom 22 may be freely extended and retracted in an axial direction by moving each boom member by a telescopic cylinder not illustrated. A base end of base boom member 22a of telescopic boom 22 is provided on swivel base 21 in a swingable manner. Telescopic boom 22 is thus horizontally rotatable and also swingable on the frame of traveling vehicle 10.

Main hook block 23 is where suspended load W is hooked and suspended, and main hook block 23 includes a plurality of hook sheaves around which main wire rope 27 is wound, and main hook 32 where suspended load W is suspended.

In addition to main hook block 23, crane apparatus 20 further includes sub-hook block 24 where suspended load W is hooked and suspended, and sub-hook block 24 includes sub-hook 33 where suspended load W is suspended.

Luffing cylinder 25 maintains a posture of telescopic boom 22 by raising or luffing down telescopic boom 22. Luffing cylinder 25 is a hydraulic cylinder including a cylinder portion and a rod portion.

Main winch 26 draws in (winds up) or draws out (winds down) main wire rope 27, and is a hydraulic winch in the present embodiment.

Main winch 26 is configured such that a main drum around which main wire rope 27 is wound is rotated by a main hydraulic motor. Main winch 26 draws out main wire rope 27 that is wound around the main drum, by hydraulic oil being supplied such that the main hydraulic motor rotates in one direction, and draws in main wire rope 27 by winding main wire rope 27 around the main drum, by hydraulic oil being supplied such that the main hydraulic motor rotates in the other direction.

Furthermore, sub-winch 28 draws in or draws out sub-wire rope 29, and is a hydraulic winch in the present embodiment.

Cabin 30 covers a driver's seat 31 where an operator is to be seated, and is provided on swivel base 21, beside telescopic boom 22.

Crane 1 configured as described above may move crane apparatus 20 to an arbitrary location by causing traveling vehicle 10 to travel, and may also extend telescopic boom 22 to an arbitrary telescopic boom length by raising telescopic boom 22 to an arbitrary luff-up angle by luffing cylinder 25.

Moreover, crane 1 includes controller 34 that controls operation of swivel base 21, telescopic boom 22, luffing cylinder 25 and the like (or in other words, operation of crane 1). Controller 34 is capable of externally outputting information about operation states of swivel base 21, telescopic boom 22, luffing cylinder 25 and the like, information about performance unique to crane 1, a weight of suspended load W, and the like.

Additionally, in the present description, an XYZ coordinate system as illustrated in FIG. 1 is defined taking an axial direction of a luff-up support of telescopic boom 22 as a reference (the same applies in the following description).

Figure 2:
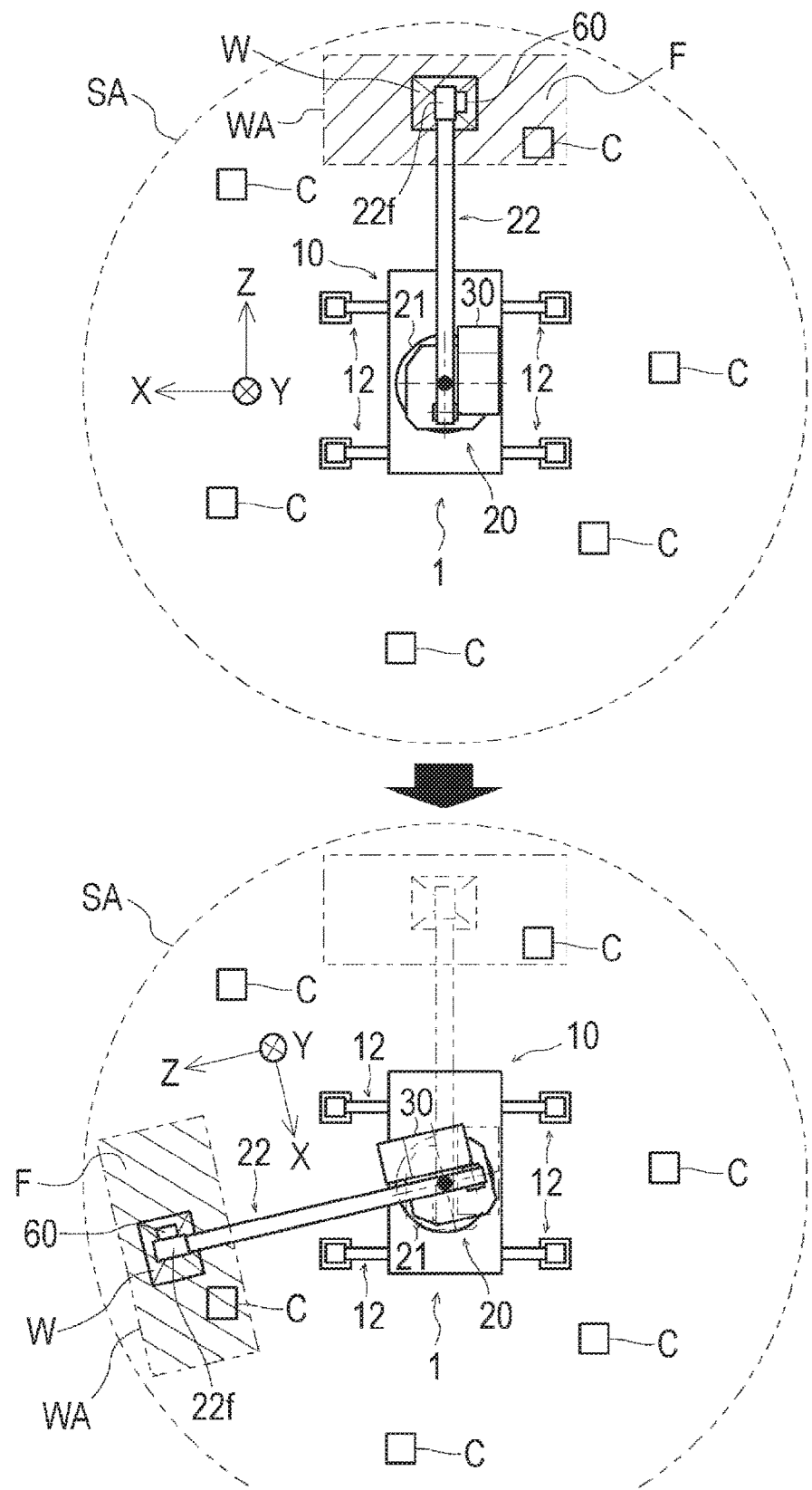
FIG. 2 is a schematic plan view for describing a suspended load region.

An X-axis direction (also referred to as a lateral line direction) is a horizontal direction that is parallel to the axial direction of the luff-up support of telescopic boom 22. A Y-axis direction (also referred to as an elevation direction) is a vertical direction. A Z-axis direction (also referred to as a depth direction) is a horizontal direction that is perpendicular to the axial direction of the luff-up support of telescopic boom 22. That is, the XYZ coordinate system is defined as a local coordinate system relative to telescopic boom 22, as illustrated in FIG. 2.

Next, a guide information display apparatus according to an embodiment of the present invention will be described.

Figure 3:
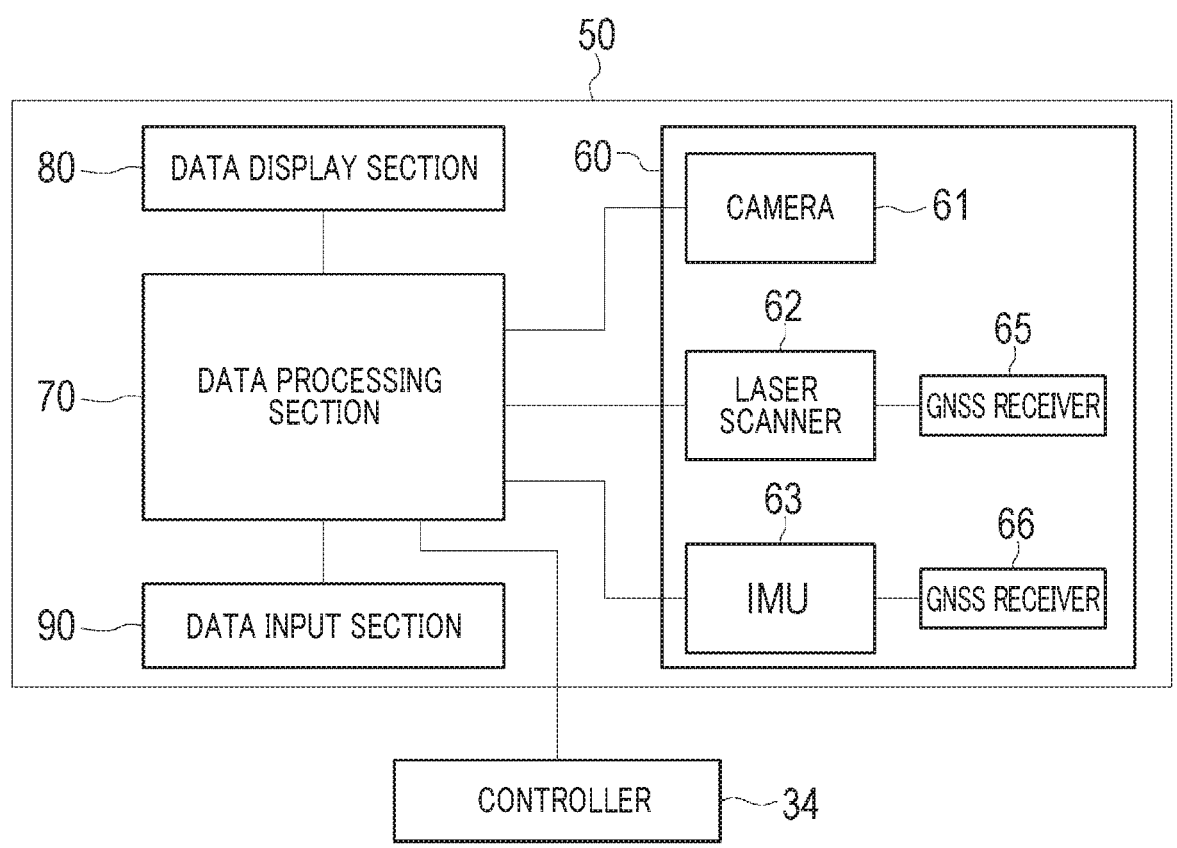
FIG. 3 is a schematic diagram illustrating an overall configuration of a guide information display apparatus according to an embodiment of the present invention.

Crane 1 includes guide information display apparatus 50 as illustrated in FIG. 3.

Guide information display apparatus 50 is an example of a guide information display apparatus according to the present invention, and is an apparatus that displays information (hereinafter, referred to as "guide information") about a region including suspended load W (hereinafter, referred to as "suspended load region WA") as an image and presents the same to an operator, such that work by crane 1 as illustrated in FIG. 1 may be efficiently and safely performed.

Figure 4:
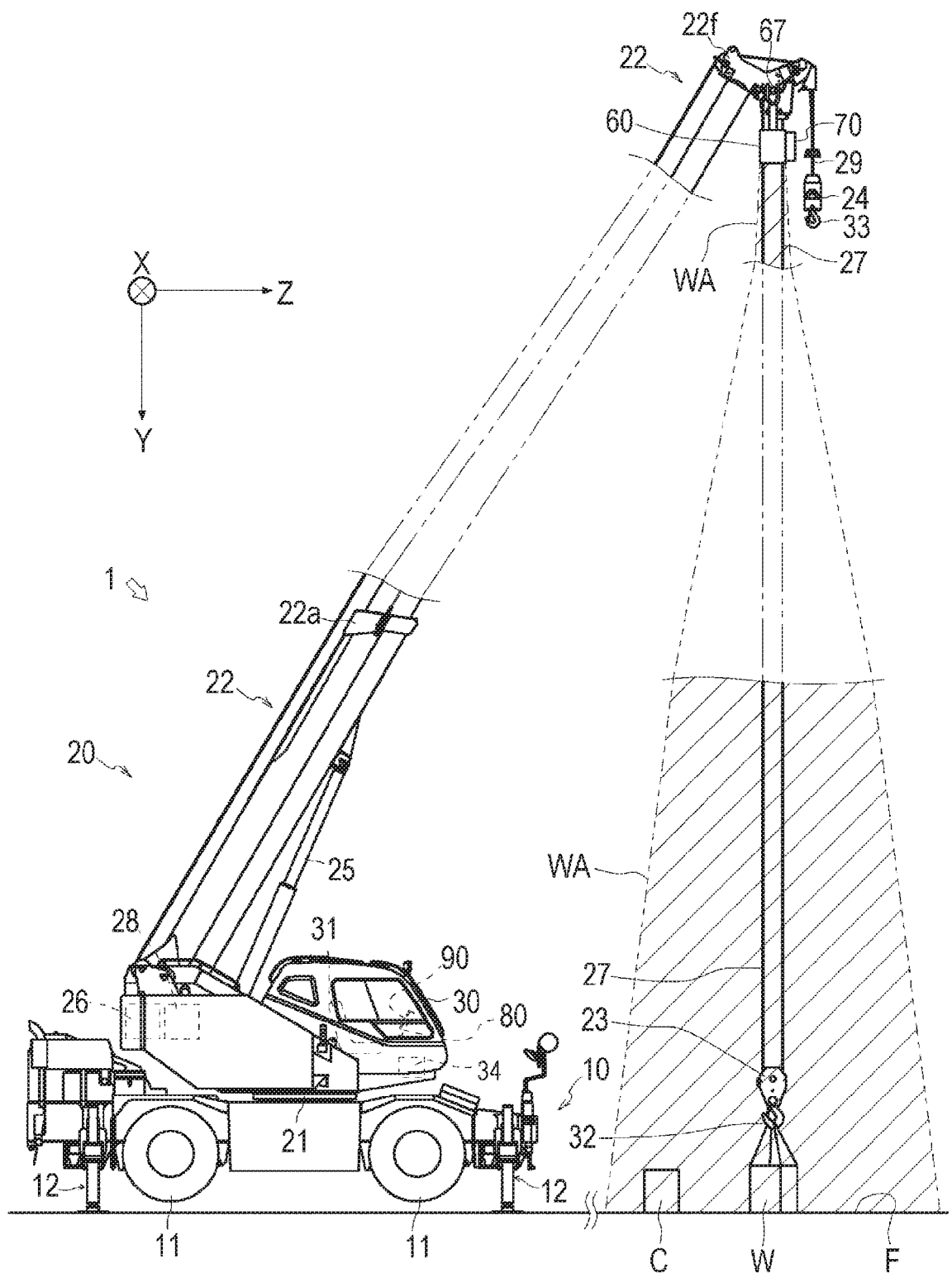
FIG. 4 is a schematic side view for describing the suspended load region.

As illustrated in FIGS. 2 and 4, "suspended load region WA" here is set as a region, in work area SA of crane 1, including suspended load W when viewed along the Y-axis direction, and is a region for which "guide information" is to be created.

"Suspended load region WA" is set as a region including a region directly below top boom member 22f of telescopic boom 22 of crane 1, and suspended load W, ground surface F, and grounded object C existing within suspended load region WA are made measurement target objects of guide information display apparatus 50. The position of "suspended load region WA" is changed according to a swiveling operation, a luff-up operation, or an extension/retraction operation of telescopic boom 22.

Furthermore, "guide information" here is information used to aid determination of an operator at the time of the operator conveying suspended load W by crane 1, with respect to whether a length, a swivel position or a luff-up angle of telescopic boom 22, the amount of winding down of a wire rope, or the like is good or not, and includes image information about suspended load region WA, information about shapes of suspended load W and grounded object C, height information of suspended load W, height information of grounded object C, information about a traffic line of suspended load W, and the like.

As illustrated in FIGS. 3 and 4, guide information display apparatus 50 includes data acquisition section 60, data processing section 70, data display section 80, and data input section 90.

Data acquisition section 60 is a part that acquires data necessary to create the guide information of suspended load region WA, and includes camera 61, laser scanner 62, and inertial measurement unit (IMU) 63, as illustrated in FIG. 3.

As illustrated in FIG. 4, data acquisition section 60 is attached to top boom member 22f positioned at a distal end of telescopic boom 22 of crane 1, and is disposed in such a manner that a situation directly below can be captured from a boom distal end positioned directly above suspended load W. Additionally, "directly above" suspended load W is a concept including a position that is vertically above suspended load W and a position of a specific range relative to such a position (such as a range of a top surface of suspended load W).

Data acquisition section 60 is attached to top boom member 22f at a distal end portion of telescopic boom 22 through gimbal 67 (see FIG. 1), and is configured such that an attitude of data acquisition section 60 (an attitude along the Y-axis direction) may be maintained substantially constant at the time of the luff-up operation, the swiveling operation, or the extension/retraction operation of telescopic boom 22. Camera 61 and laser scanner 62 may thereby constantly face suspended load W. Accordingly, data acquisition section 60 may constantly acquire data by camera 61 and laser scanner 62, from suspended load W and ground surface F below suspended load W (that is, suspended load region WA). Furthermore, in the case where grounded object C exists in suspended load region WA, data about grounded object C may be acquired by camera 61 and laser scanner 62.

Figure 5A:
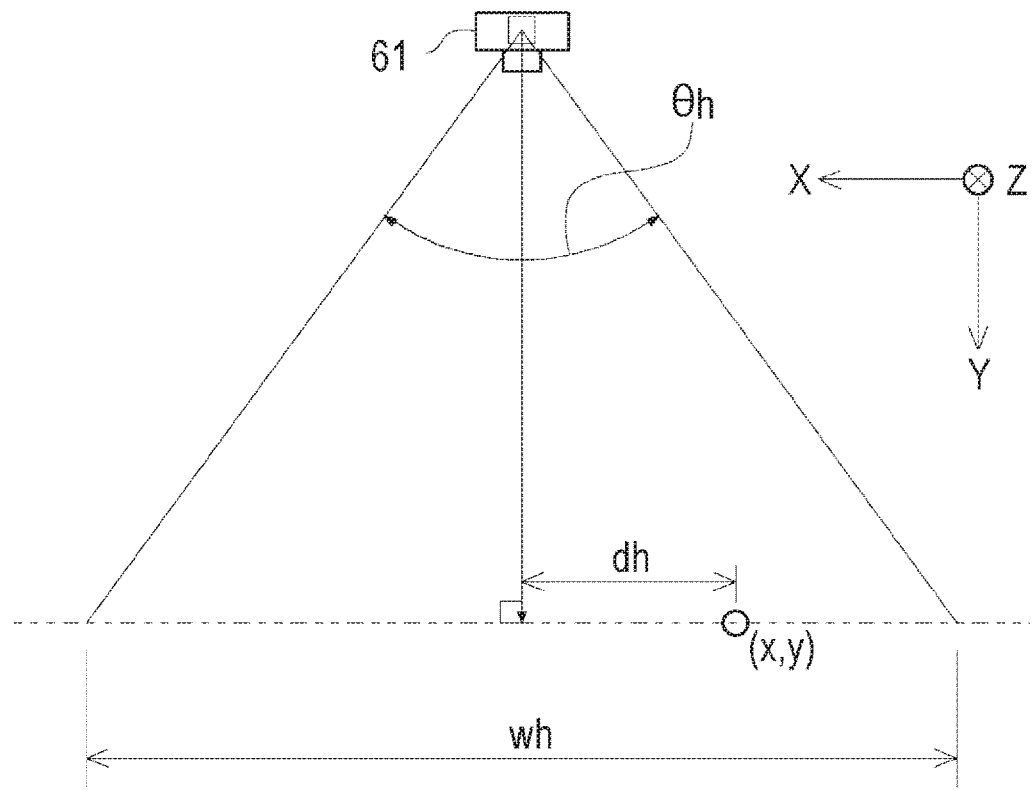
FIGS. 5A and 5B are explanatory diagrams of a camera spatial coordinate system and a viewing angle of a camera, where
Figure 5B:
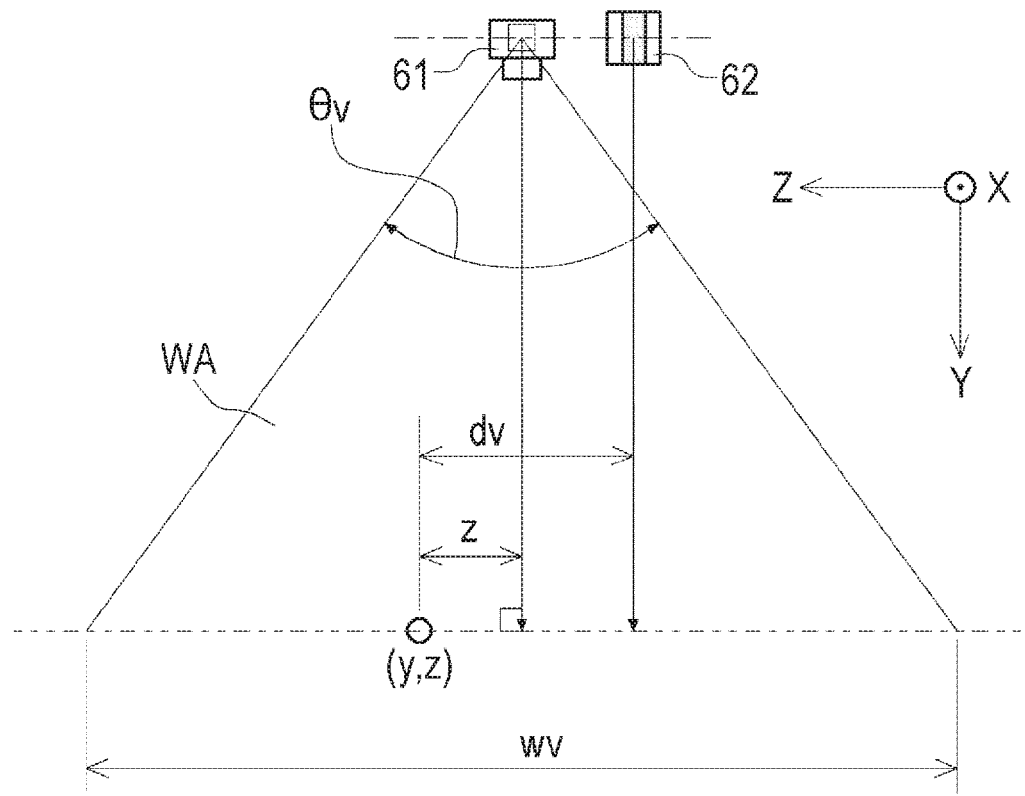

As illustrated in FIGS. 5A and 5B, camera 61 is a digital video camera that captures video of suspended load region WA, and includes a function of externally outputting, in real time, video that is captured. Camera 61 has viewing angles (horizontal viewing angle θh and vertical viewing angle θv) as illustrated in FIGS. 5A and 5B. Furthermore, the number of pixels, a frame rate and an image transfer rate of camera 61 are such that the amount of data necessary to create appropriate guide information is taken into account.

As illustrated in FIG. 3, laser scanner 62 is an apparatus that radiates laser on a measurement target object and receives reflected light of the laser from the measurement target object to thereby acquire information about a reflection point and to acquire point cloud data of the measurement target object. The measurement target objects of laser scanner 62 are suspended load W, grounded object C, and ground surface F. Moreover, first GNSS receiver 65 that acquires a measurement time is connected to laser scanner 62.

Guide information display apparatus 50 acquires planar three-dimensional point cloud data in real time by laser scanner 62.

Figure 6A:
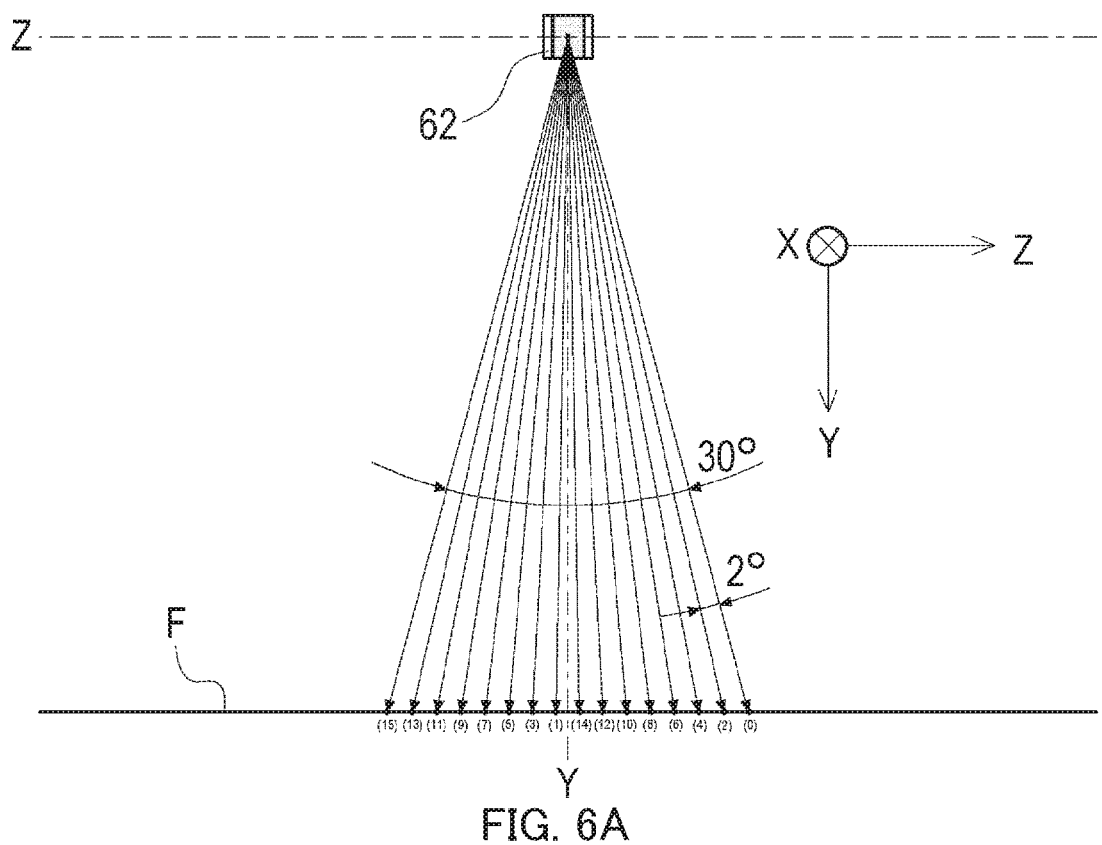
FIGS. 6A and 6B are explanatory diagrams of a radiation state of laser by a laser scanner, where
Figure 6B:
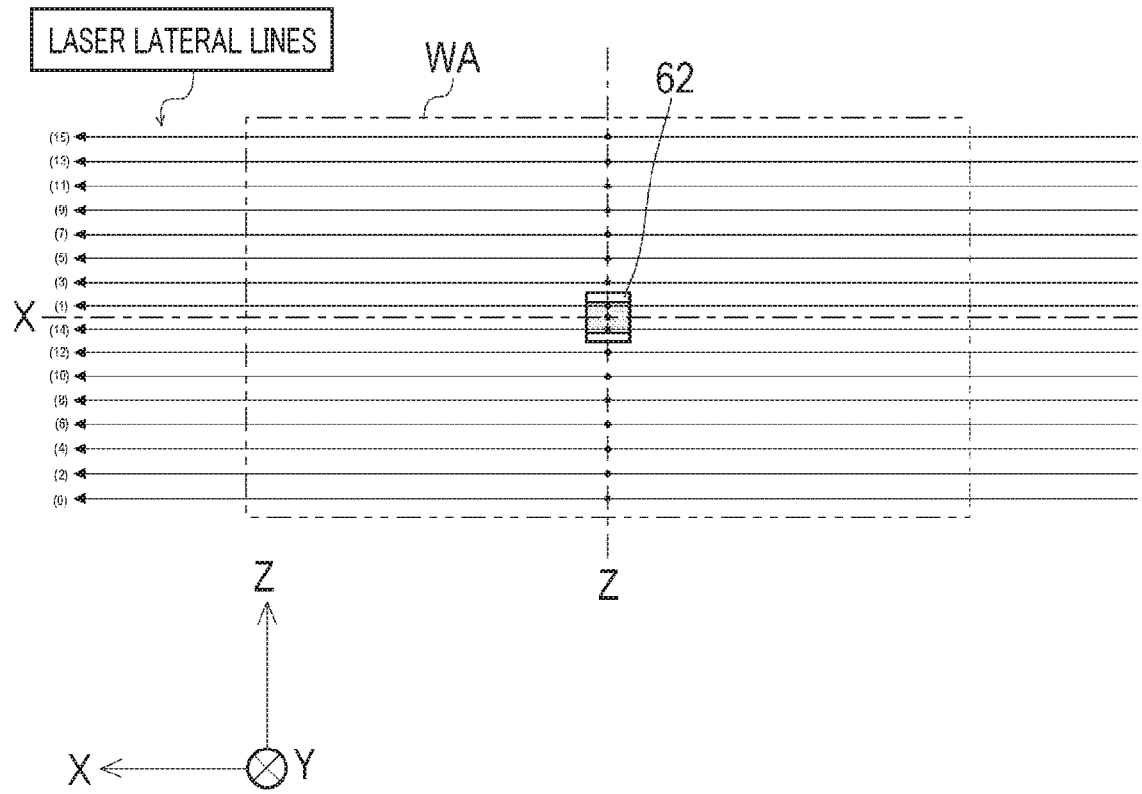

As illustrated in FIGS. 6A and 6B, laser scanner 62 includes a total of 16 laser transmitter/receiver sensors, and is capable of acquiring point cloud data of a measurement target object by simultaneously radiating 16 laser beams on the measurement target object. The 16 laser transmitter/receiver sensors of laser scanner 62 are arranged with radiation angles shifted by 2 degrees in the Z-axis direction, and are configured such that laser over a range of 30 degrees in total may be radiated on the measurement target object. Furthermore, each laser transmitter/receiver sensor of laser scanner 62 is capable of rotating 360 degrees (entire azimuth) around the Z-axis. Additionally, in the following description, a trajectory of laser that is radiated toward suspended load region WA will be referred to as a laser lateral line. The laser lateral line is parallel to the X-axis direction, and with laser scanner 62, 16 laser lateral lines are drawn at the same time.

Moreover, laser scanner 62 is disposed such that the laser lateral line becomes parallel to the X-axis direction. A reference axis of laser scanner 62 for changing the radiation angle of laser is parallel to the Z-axis direction.

As illustrated in FIG. 3, inertial measurement unit (hereinafter, referred to as "IMU") 63 is an apparatus that acquires attitude data of camera 61 and laser scanner 62 at the time of data acquisition. IMU 63 is capable of measuring an attitude angle in real time, and achieves a measurement accuracy allowing use in correction of point cloud data acquired by laser scanner 62. Moreover, second GNSS receiver 66 that acquires a measurement time is connected to IMU 63.

Figure 7A:
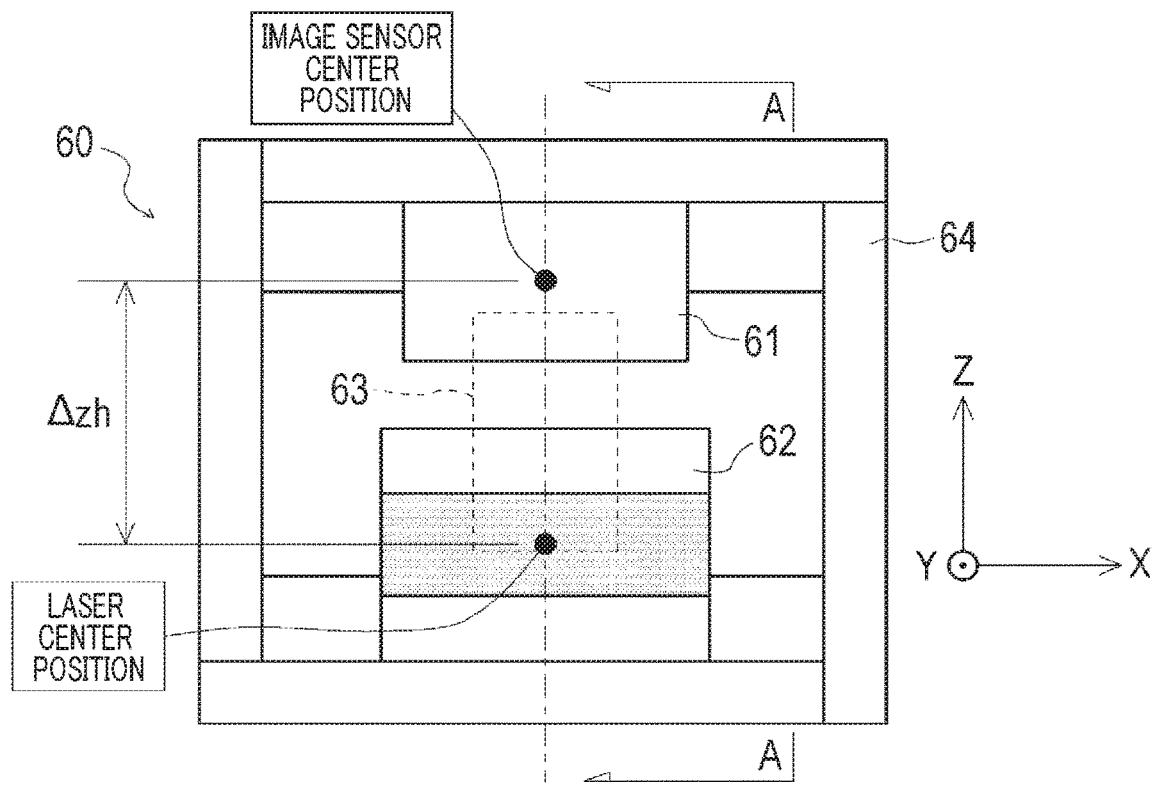
FIGS. 7A and 7B are schematic diagrams illustrating a data acquisition section, where
Figure 7B:
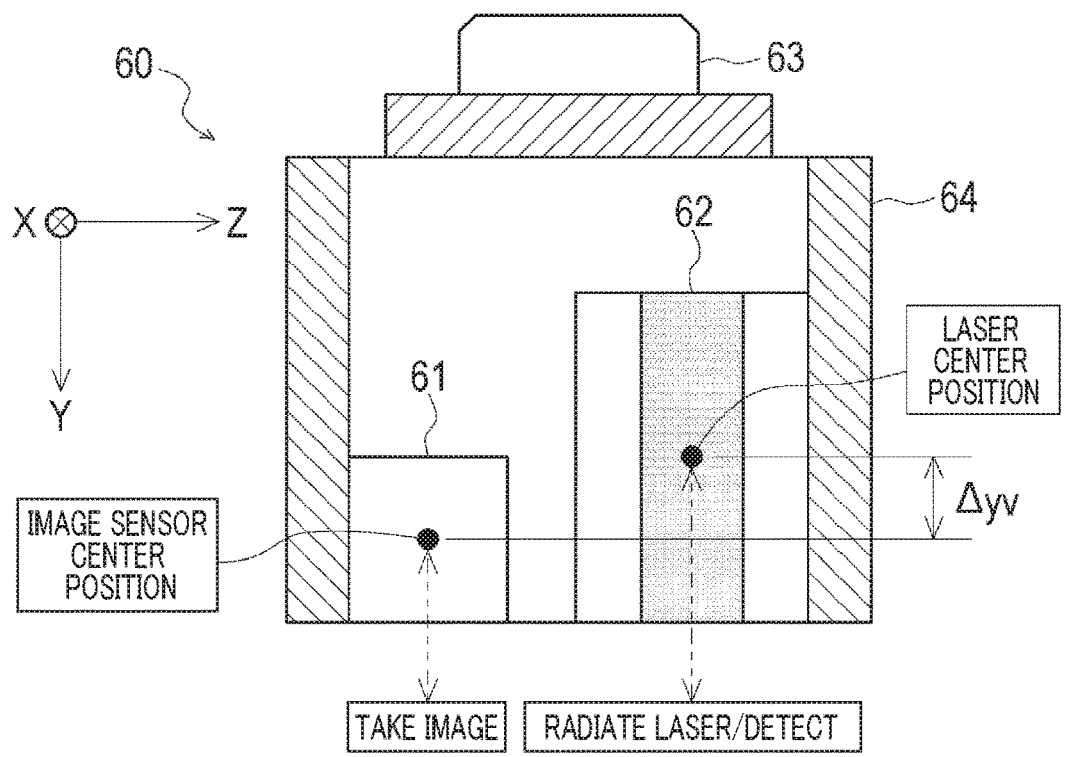

As illustrated in FIGS. 7A and 7B, data acquisition section 60 is a sensor unit where camera 61, laser scanner 62, and inertial measurement unit (IMU) 63 are integrally fixed to frame body 64.

Frame body 64 is a substantially cuboid object formed by combining five plate members. Frame body 64 is formed into a shape having an opening at a bottom, with four side surface portions of the cuboid being formed by four plate members and a top surface portion of the cuboid being formed by the remaining one plate member. With data acquisition section 60, camera 61 and laser scanner 62 are attached on inner sides of the side surface portions of frame body 64, and IMU 63 is attached to the top surface portion of frame body 64. As illustrated in FIG. 7A, an image sensor center position of camera 61 and a laser center position of laser scanner 62 are separated by distance $\Delta zh$ in the Z-axis direction, when viewed along the Y-axis direction. Additionally, the laser center position is a laser rotation center of laser scanner 62, and is on the Z-axis.

Furthermore, as illustrated in FIG. 7B, the image sensor center position of camera 61 and the laser center position of laser scanner 62 are separated by distance $\Delta yv$ in the Y-axis direction, when viewed along the X-axis direction.

Data acquisition section 60 is disposed at an attitude according to which, of the four side surface portions of frame body 64, one of pairs of facing side surface portions is perpendicular to the Z-axis, and the other of the pairs of facing side surface portions is perpendicular to the X-axis. Furthermore, data acquisition section 60 is disposed at an attitude according to which the top surface portion of frame body 64 is perpendicular to the Y-axis.

Next, a method of transforming an X coordinate of a point (x, y) in the XYZ coordinate system into an Xc coordinate in a camera spatial coordinate system will be described.

To display image M taken by camera 61 and guide information GD described later on data display section 80 in an overlapping manner, guide information display apparatus 50 performs a coordinate value transformation process between the XYZ coordinate system and the camera spatial coordinate system. Guide information display apparatus 50 defines a three-dimensional camera spatial coordinate system Xc·Yc·Zc in an image space of camera 61.

As illustrated in FIG. 5A, a distance between a perpendicular extending from a lens center of camera 61 and the point (x, y) in the X-axis direction is given as dh, and a maximum screen width of camera 61 in the horizontal direction is given as wh. Furthermore, x of the point (x, y) is a position in the X-axis direction from a screen center. At this time, the Xc coordinate of the point (x, y) in the camera space is expressed by following expressions (1) and (2).

Additionally, in the following expressions, a difference between positions of the image sensor of camera 61 and the laser center in the horizontal direction is given as $\Delta zh$ (see FIG. 7A), a lateral width of a camera image as wh, the horizontal viewing angle of camera 61 as $\theta h$, and a temporary variable as tmp1.

$$tmp1=(y-\Delta zh)\times\tan(\pi\times\theta h/360) \quad (1)$$

$$Xc=wh/2-wh\times x/(2\times tmp1) \quad (2)$$

Next, a method of transforming a Z coordinate of a point (y, z) in the XYZ coordinate system into a Zc coordinate in the camera spatial coordinate system will be described.

As illustrated in FIG. 5B, a distance between the point (y, z) and the laser center in the Z-axis direction is given as dv, and a maximum screen width of camera 61 in the horizontal direction is given as wv. Furthermore, z of the point (y, z) is a position in the Z-axis direction from the screen center. At this time, the Zc coordinate of the point (y, z) in the camera space is expressed by following expressions (3) and (4).

Additionally, in the following expressions, a difference between positions of the image sensor of camera 61 and the laser center of laser scanner 62 in the vertical direction is given as $\Delta yv$ (see FIG. 7B), a vertical width of the camera image as wv, the vertical viewing angle of camera 61 as $\theta v$, and a temporary variable as tmp2.

$$tmp2=Y\times\tan(\pi\times\theta v/360) \quad (3)$$

$$Zc=wv/2+wv\times(Z-\Delta yv)/(2\times tmp2) \quad (4)$$

Guide information display apparatus 50 transforms coordinates of point cloud data acquired by laser scanner 62 or the like in the XYZ coordinate system into those in the camera spatial coordinate system by using expressions (1) to (4) above, and thereby performs display by adjusting a position of guide information GD on image M taken by camera 61.

Additionally, as laser scanner 62, a device that is capable of measuring a three-dimensional shape of a measurement target object from a maximum reachable height of telescopic boom 22 (for example, about 100 meters) is selected by taking into account the maximum reachable height. Furthermore, as laser scanner 62, a device that achieves predetermined performance with respect to specifications regarding a measurement speed, the number of measurement points, a measurement accuracy and the like is selected, by taking into account the amount of data and a data accuracy necessary to create appropriate guide information.

Additionally, the present embodiment describes, as an example, a case where laser scanner 62 including a total of 16 laser transmitter/receiver sensors is used, but the guide information display apparatus according to the present invention is not limited by the number of laser transmitter/receiver sensors forming the laser scanner. That is, with the guide information display apparatus according to the present invention, a laser scanner of optimal specifications is selected as appropriate according to the maximum reachable height of the boom (jib) of the crane, or the like.

Data that is acquired from suspended load region WA by data acquisition section 60 includes image data, taken by camera 61, of suspended load W, ground surface F below suspended load W, and grounded object C existing around suspended load W. Furthermore, data that is acquired from suspended load region WA by data acquisition section 60 includes point cloud data that is acquired by scanning suspended load W, ground surface F, and grounded object C by laser scanner 62. Additionally, ground surface F here broadly includes surfaces of a transfer origin and a transfer destination of suspended load W, and includes not only a surface of a ground, but also a surface of a rooftop terrace of a building, a rooftop surface and the like.

As illustrated in FIG. 3, data processing section 70 is a part that processes data that is acquired by data acquisition section 60, and creates guide information GD to be presented to the operator, and in the present embodiment, data processing section 70 is a general-purpose personal computer where predetermined data processing programs are installed.

Moreover, data processing section 70 is electrically connected to controller 34 of crane 1, and "crane information" that is output from controller 34 is input to data processing section 70.

Data display section 80 is a part that displays guide information GD to be presented to the operator, and is a display apparatus that is connected to data processing section 70.

Figure 8A:
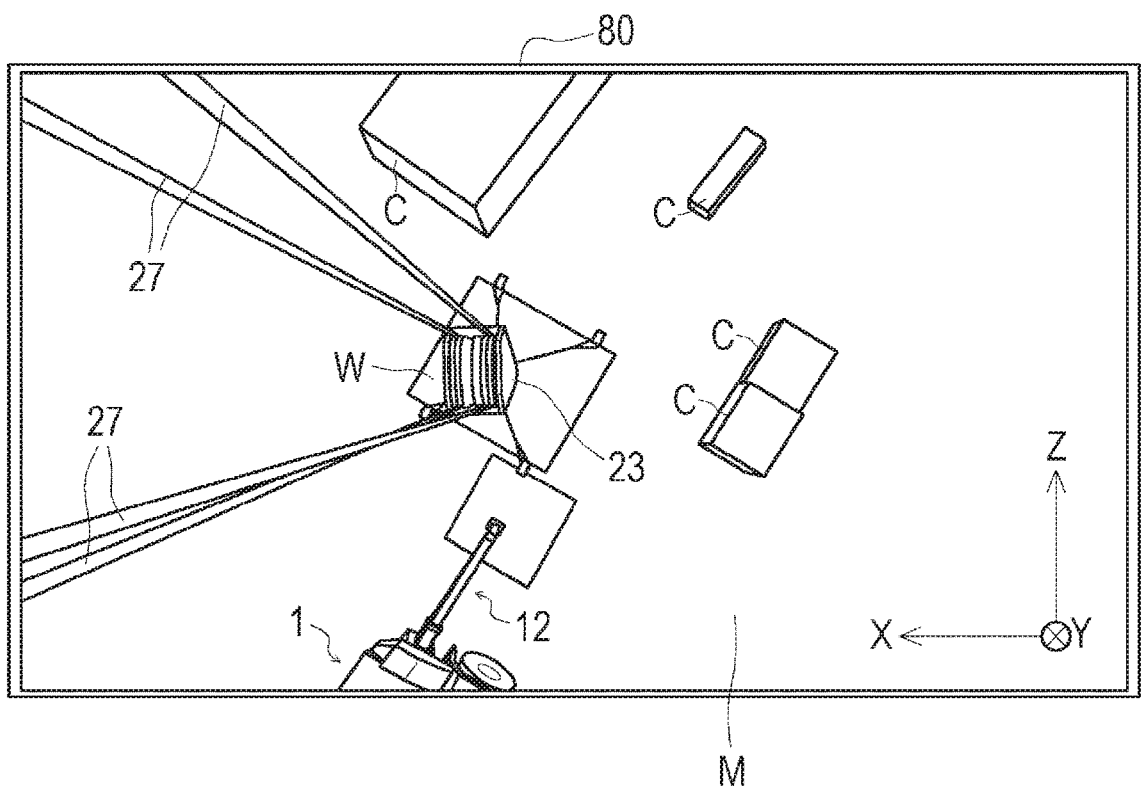
FIGS. 8A and 8B are diagrams illustrating a display state of guide information, where

As illustrated in FIG. 8A, image M of suspended load region WA taken by camera 61 is displayed in real time on data display section 80.

Figure 8B:
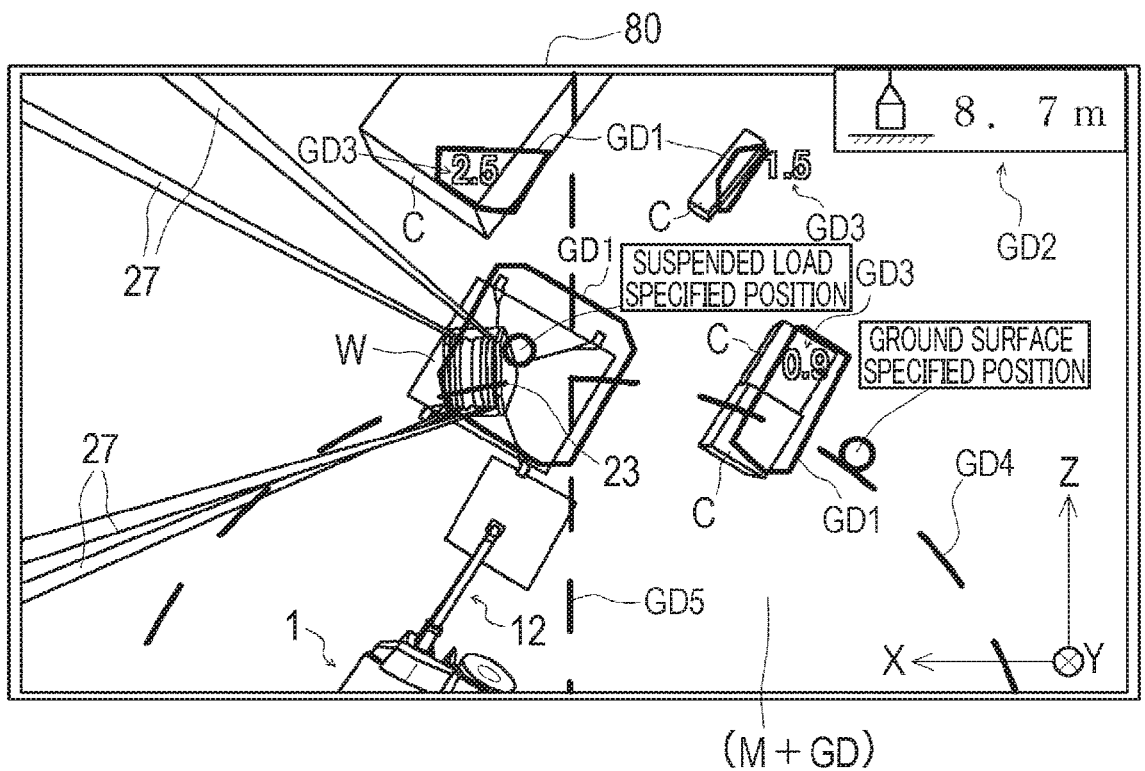

As illustrated in FIG. 8B, guide information GD includes guide frame GD1 indicating an outer shape of suspended load W or grounded object C that is viewed along the Y-axis direction, height information GD2 of a bottom surface of suspended load W, height information GD3 of a top surface of grounded object C, working radius information GD4 indicating a traffic line of suspended load W, axial line information GD5 indicating an axial line direction of telescopic boom 22, and the like.

Moreover, guide information GD created by data processing section 70 and image M are superimposed and displayed on data display section 80.

As illustrated in FIG. 3, data input section 90 is a part used to input setting values and the like to data processing section 70, and is configured from a touch panel, a mouse, a keyboard apparatus and the like.

Figure 9A:
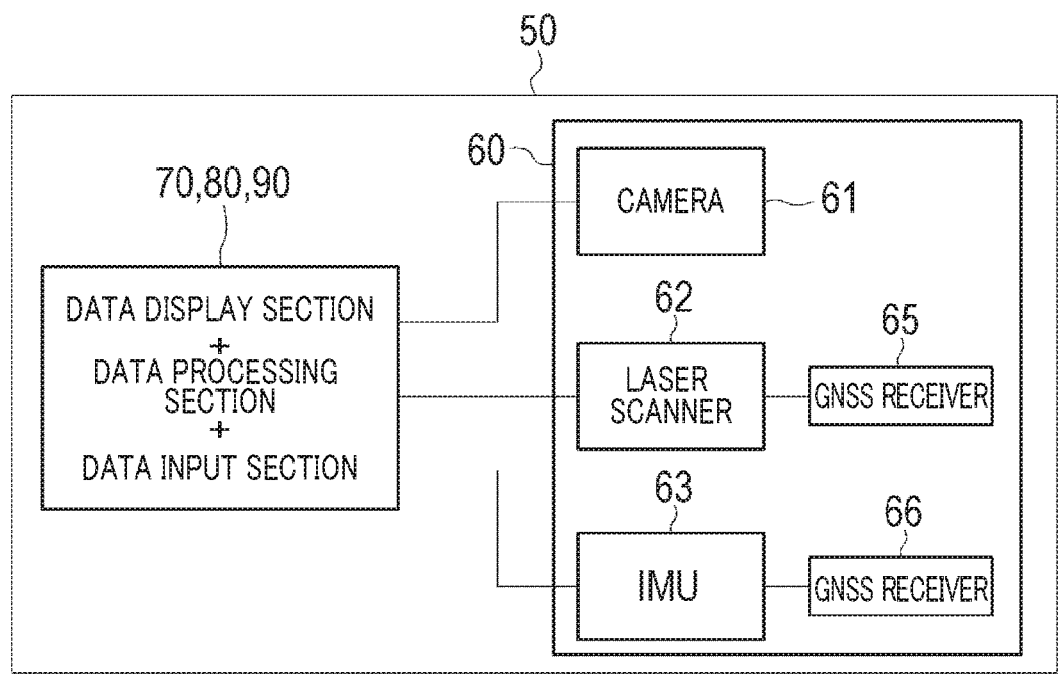
FIGS. 9A and 9B are schematic diagrams illustrating different configurations of the guide information display apparatus, where
Figure 9B:
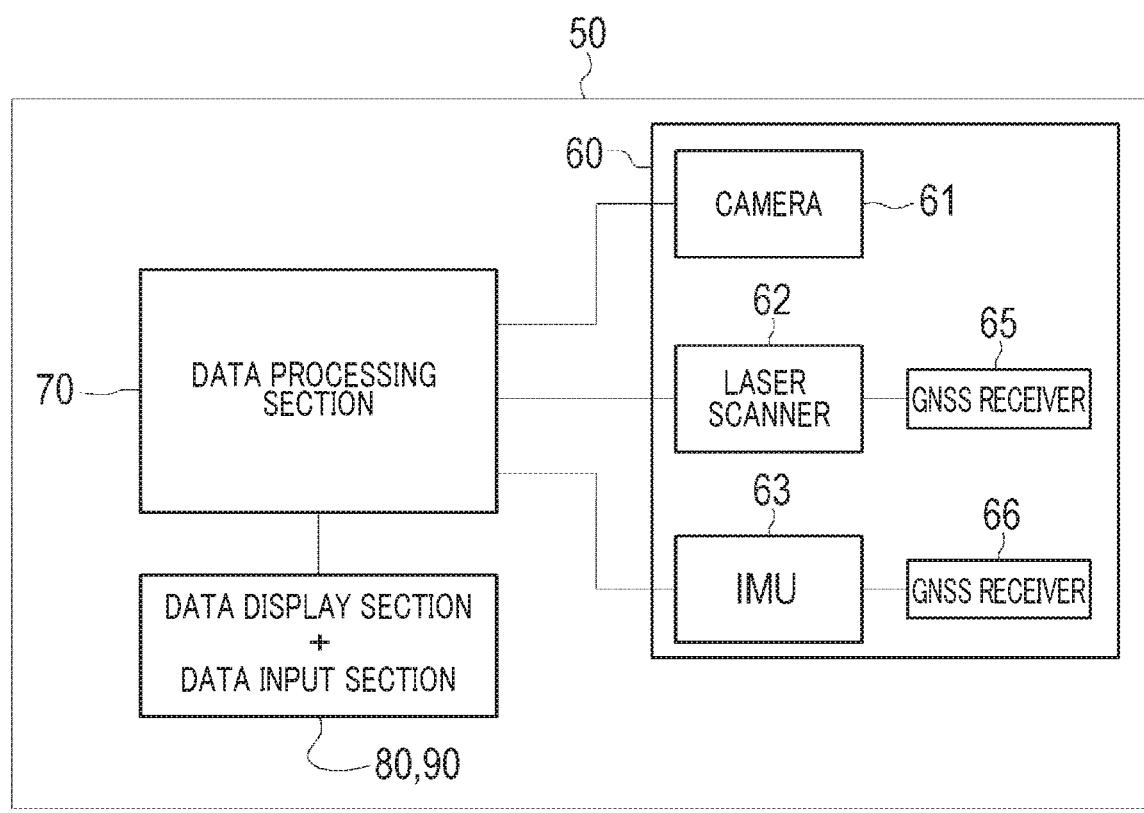

Additionally, as illustrated in FIG. 9A, with guide information display apparatus 50, data processing section 70, data display section 80, and data input section 90 are desirably integrally configured by a general-purpose tablet personal computer (hereinafter, referred to also as a tablet PC). Alternatively, as illustrated in FIG. 9B, with guide information display apparatus 50, data display section 80 and data input section 90 may be integrally configured by a touch panel display apparatus, and data processing section 70 which is a general-purpose PC may be connected to the touch panel display apparatus.

As illustrated in FIG. 4, data display section 80 and data input section 90 are disposed inside cabin 30, at positions in front of driver's seat 31 that are easily visible to the operator. Data processing section 70 is desirably disposed near data acquisition section 60. Additionally, in the case where data processing section 70, data display section 80, and data input section 90 are integrally configured by a tablet PC, data processing section 70 may be disposed inside cabin 30.

A wired LAN is desirably used for data transmission between data acquisition section 60 and data processing section 70. Additionally, a wireless LAN or power line communication may be used for data transmission between data acquisition section 60 and data processing section 70.

Additionally, as illustrated in FIG. 9A, with guide information display apparatus 50, data processing section 70, data display section 80, and data input section 90 are desirably integrally configured by a general-purpose tablet personal computer (hereinafter, referred to also as a tablet PC). Alternatively, as illustrated in FIG. 9B, with guide information display apparatus 50, data display section 80 and data input section 90 may be integrally configured by a touch panel display apparatus, and data processing section 70 which is a general-purpose PC may be connected to the touch panel display apparatus.

A state of acquisition of data by data acquisition section 60 will now be described.

Data acquisition section 60 continuously captures suspended load region WA by camera 61, and acquires image M of suspended load region WA.

Figure 10:
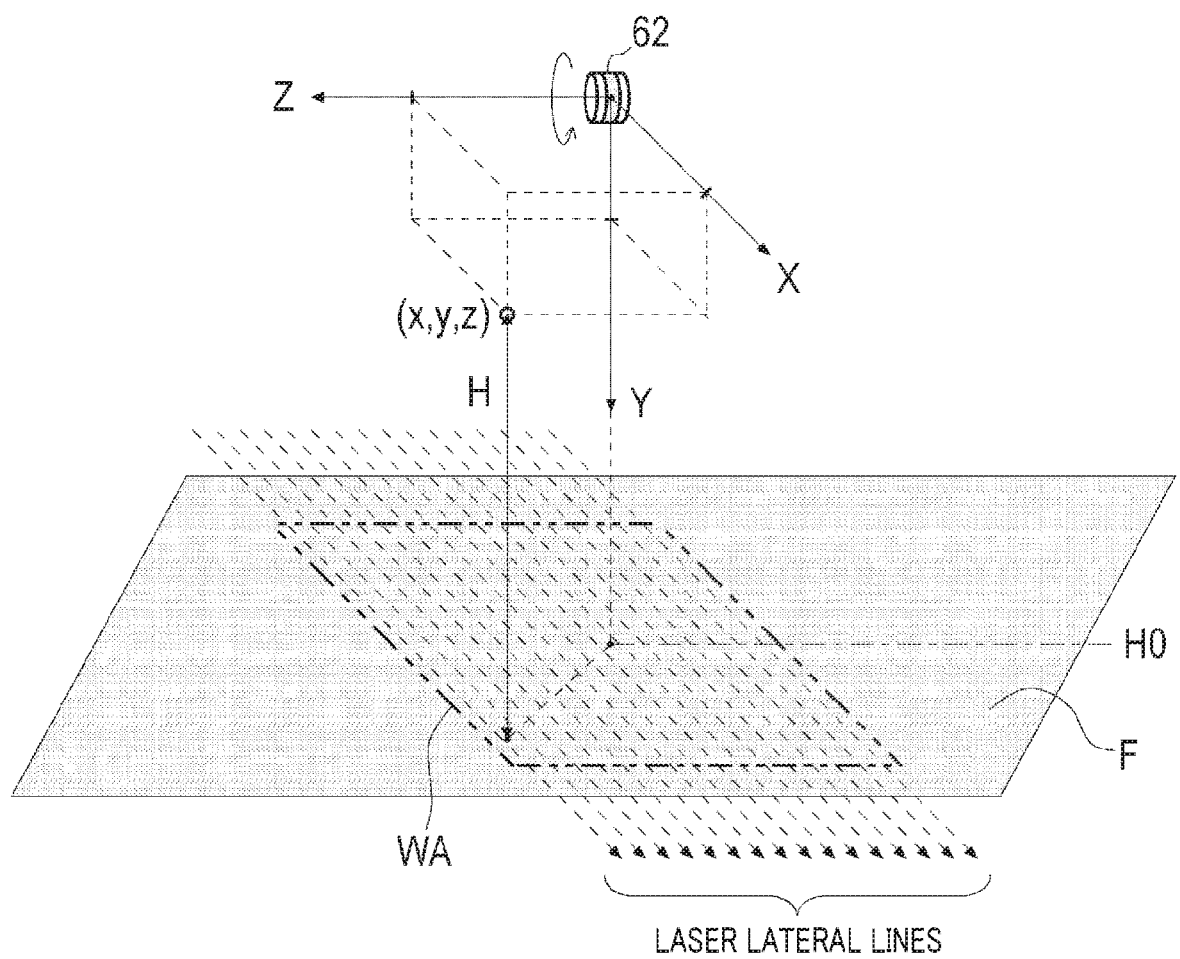
FIG. 10 is a schematic diagram illustrating a relationship between the suspended load region and laser lateral lines.
Figure 11:
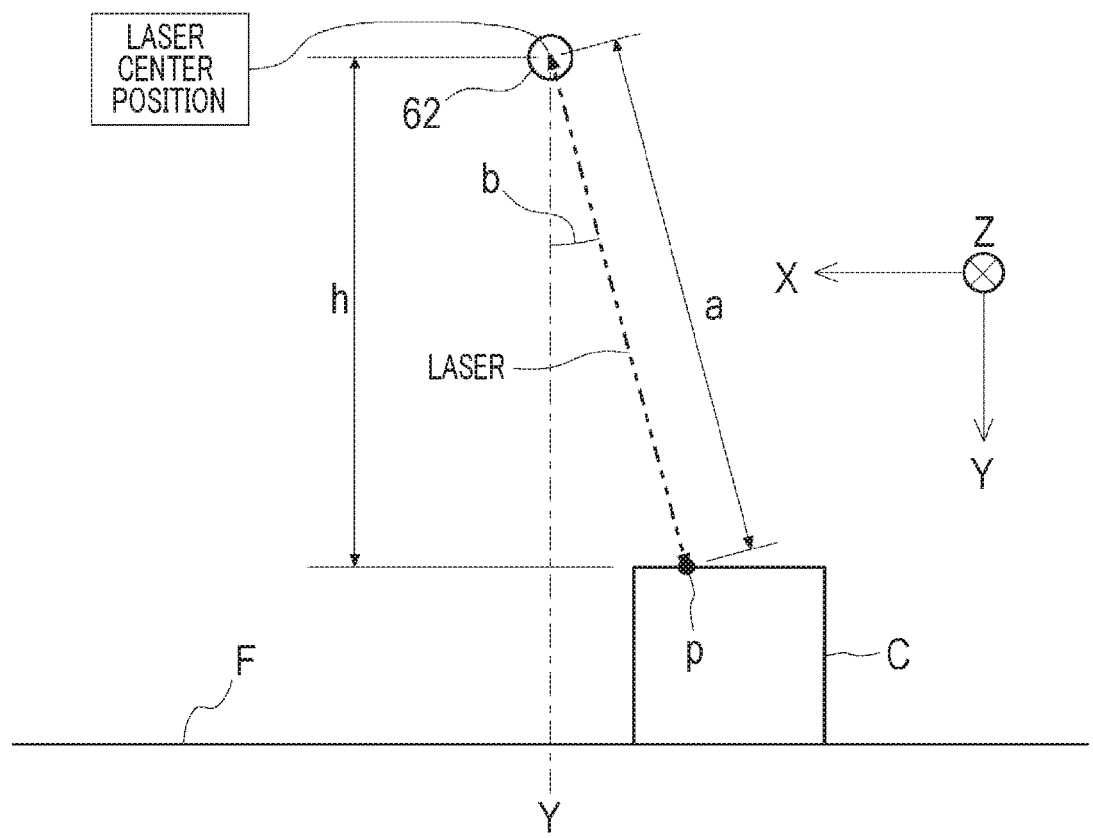
FIG. 11 is a schematic diagram along the Z-axis direction for describing the radiation state of laser by the laser scanner.

As illustrated in FIG. 10, data acquisition section 60 continuously scans suspended load region WA by laser scanner 62, and acquires point cloud data of a measurement target object in suspended load region WA. In the following, point cloud data that is acquired by laser scanner 62 will be referred to as point cloud data P. Point cloud data P is a set of point data p, and point data p indicates each point on ground surface F, suspended load W, and a top surface of grounded object C that are present in suspended load region WA. Furthermore, as illustrated in FIG. 11, point data p includes information about distance a between a measurement target object (such as grounded object C) and laser scanner 62, and about radiation angle b of laser scanner 62 at a time of acquisition of point data p in question.

As illustrated in FIG. 3, first GNSS receiver 65 is connected to laser scanner 62, and time information is received by first GNSS receiver 65 from a plurality of positioning satellites at the same time as acquisition of point cloud data P. Data processing section 70 adds information about an acquisition time of point data p to point data p in question. That is, information about point data p includes acquisition time tp, in addition to distance a and radiation angle b.

Furthermore, at the same time as acquiring point cloud data P by laser scanner 62, data acquisition section 60 acquires, by IMU 63, attitude data Q of laser scanner 62 at predetermined intervals. Attitude data Q includes information about acceleration and an angle of laser scanner 62 with respect to each axis direction of X-, Y-, Z-axes. Additionally, an acquisition cycle of attitude data Q by IMU 63 is set shorter than an acquisition cycle of point cloud data P by laser scanner 62. Attitude data Q is a set of individual attitude data q that is measured in each measurement cycle.

Second GNSS receiver 66 is connected to IMU 63, and time information is received by second GNSS receiver 66 from a plurality of positioning satellites at the same time as acquisition of attitude data Q. Data processing section 70 adds acquisition time tq to individual attitude data q, as information about an acquisition time of individual attitude data q in question. That is, information about individual attitude data q includes acquisition information tq.

Next, a state of processing of data by data processing section 70 will be described.

Figure 12:
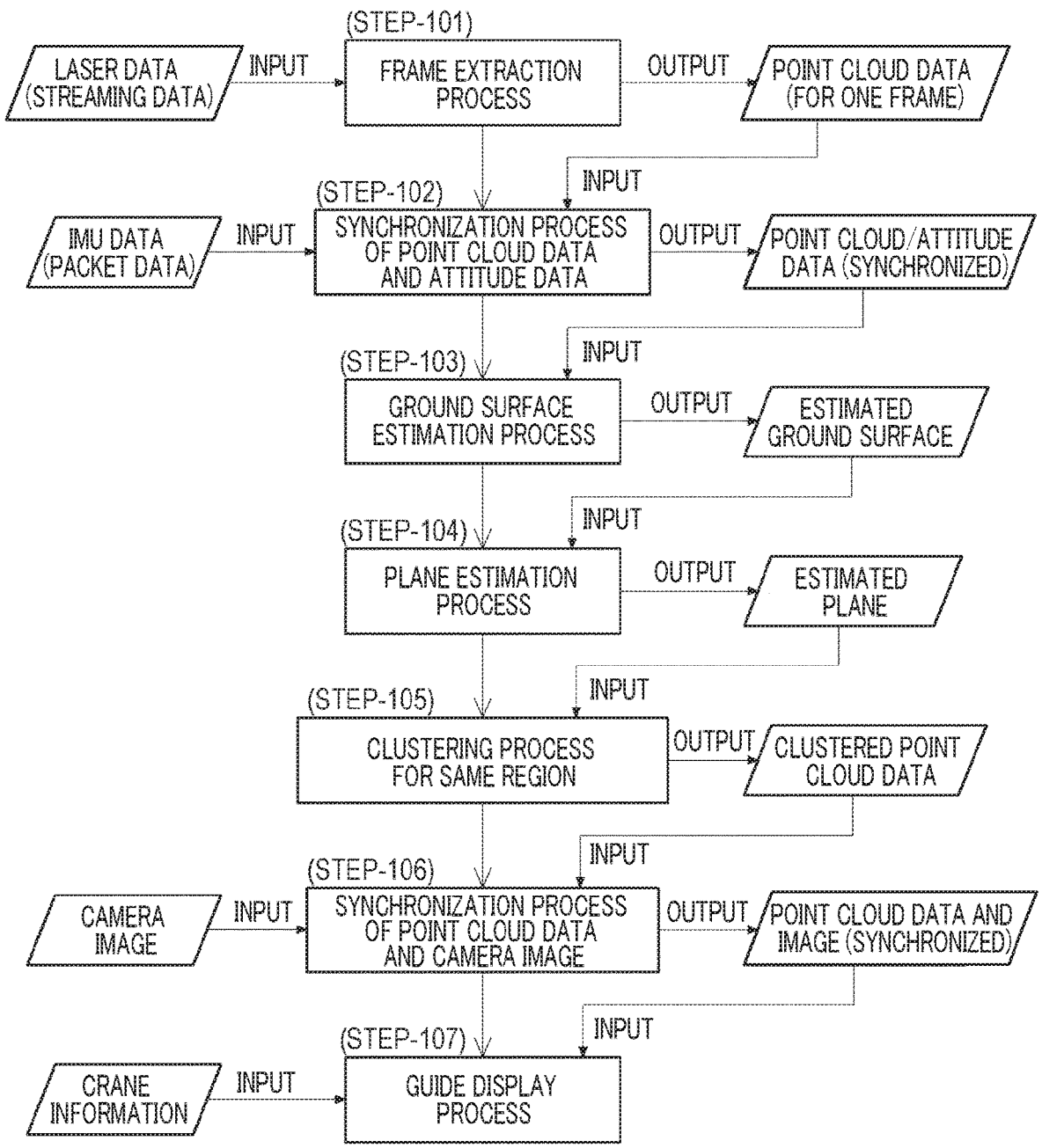
FIG. 12 is a flow diagram illustrating a flow of data processing by the data processing section.

As illustrated in FIG. 12, in data processing by data processing section 70, a "frame extraction process" is first performed (STEP-101).

In the data processing of point cloud data P by data processing section 70, point cloud data P for one frame is segmented and output from stream data of point cloud data P. Point cloud data P for one frame is a set of point data p acquired while the radiation direction of laser by laser scanner 62 makes one round around the Z-axis.

As illustrated in FIG. 12, in the data processing by data processing section 70, a "synchronization process of point cloud data and attitude data" is next performed (STEP-102).

Data processing section 70 synchronizes point data p included in point cloud data P for one frame with attitude data Q acquired by IMU 63.

Specifically, synchronization is performed for each point data p, by retrieving acquisition time tq of individual attitude data q closest to acquisition time tp of point data p in question, and associating individual attitude data q at acquisition time tq in question with point data p in question.

Data processing section 70 outputs point data p synchronized with individual attitude data q in the manner described above.

Then, as illustrated in FIG. 11, data processing section 70 calculates distance h from the laser center position of laser scanner 62 to point data p on the basis of distance a and radiation angle b. Additionally, "distance h" here is a distance from the laser center position of laser scanner 62 to a horizontal plane where point data p is present.

Furthermore, at the time of calculating distance h of point data p, data processing section 70 performs correction using individual attitude data q for point data p in question. An error due to the attitude of laser scanner 62 may thereby be eliminated, and distance h of point data p may be more accurately calculated.

That is, with guide information display apparatus 50, data acquisition section 60 includes IMU 63 that acquires attitude data Q of laser scanner 62, and data processing section 70 corrects point cloud data P on the basis of attitude data Q of laser scanner 62 acquired by IMU 63.

According to such a configuration, guide information display apparatus 50 may present more accurate guide information GD to the operator.

Figure 13A:
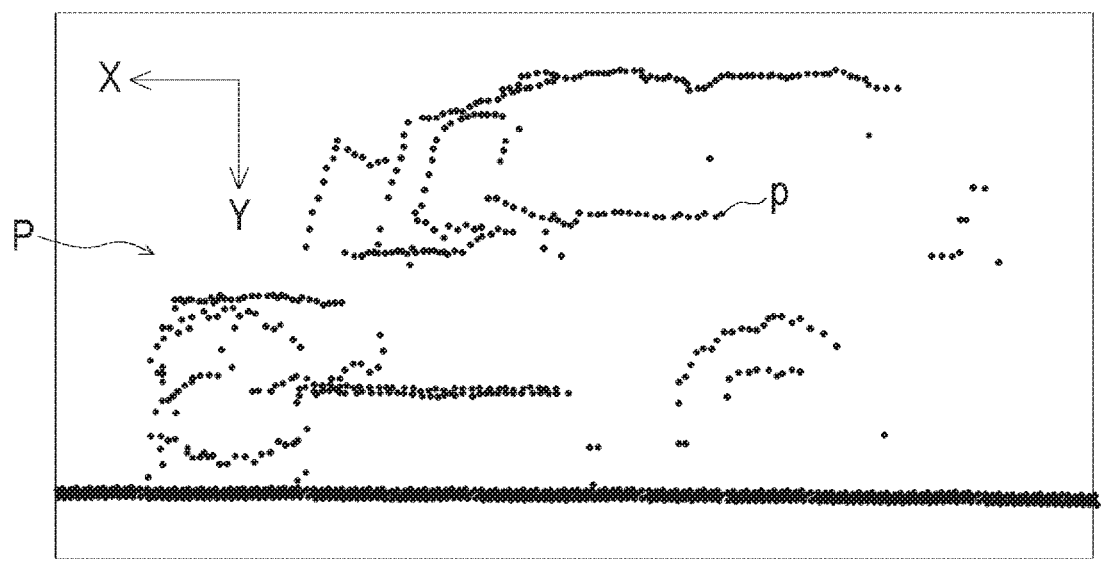
FIGS. 13A and 13B are diagrams illustrating point cloud data acquired by the data acquisition section, where

When point cloud data P for one frame is plotted in the XYZ coordinate system, it is shown as FIG. 13A. FIG. 13A illustrates point cloud data P (a set of point data p) viewed in the Z-axis direction.

As illustrated in FIG. 12, in the data processing by data processing section 70, a "ground surface estimation process"

is next performed (STEP-103). Data processing section 70 performs a process of estimating ground surface F.

First, a case of estimating ground surface F by taking a specific position in an image as a reference will be described. Additionally, a case is described here, as an example, where the operator manually specifies a specific position in an image, but a specific position in an image may alternatively be automatically determined and specified by data processing section 70.

With guide information display apparatus 50, ground surface F as a reference may be determined by specifying a position on the ground surface using data display section 80 and data input section 90.

Figure 14:
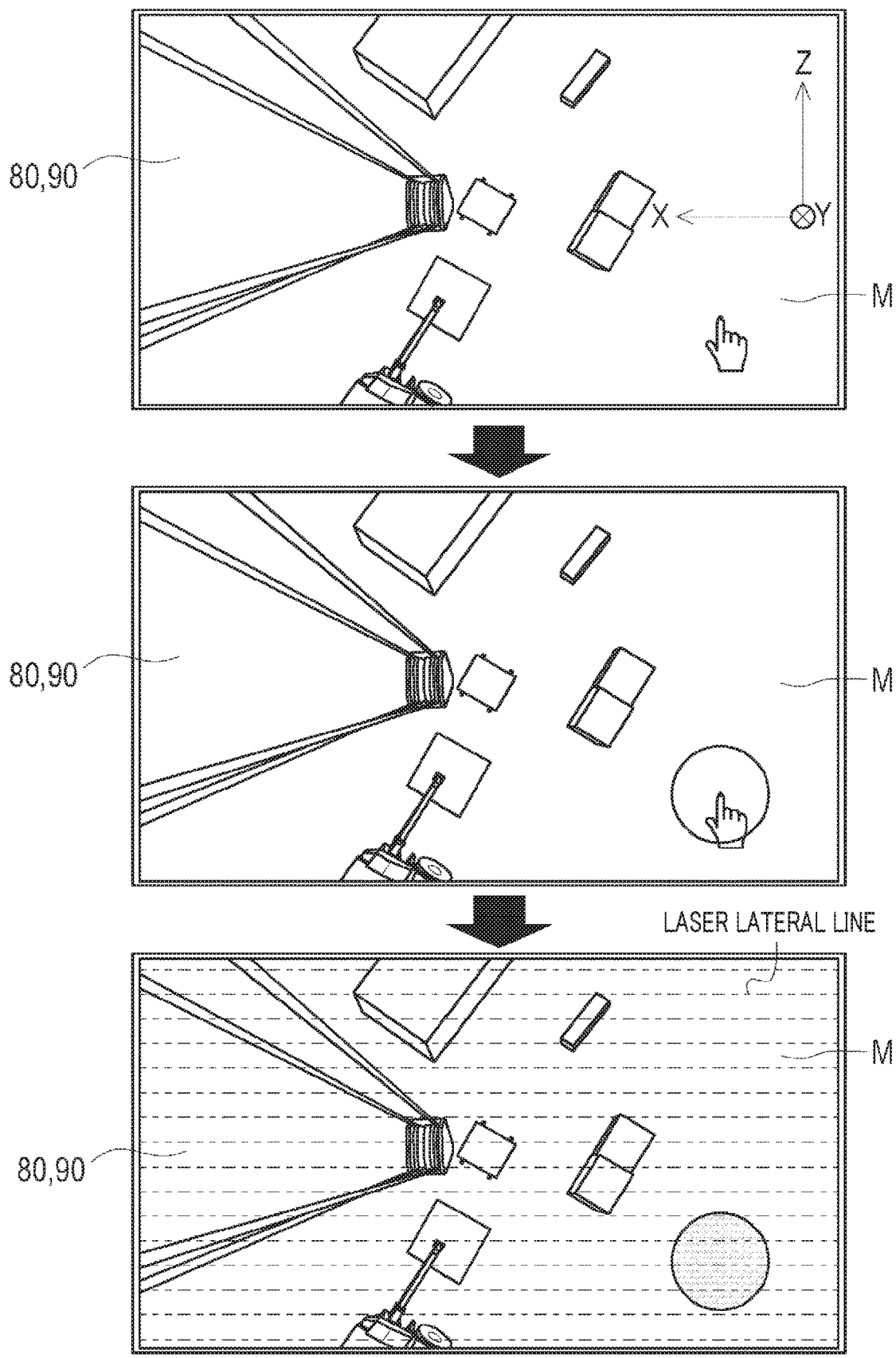
FIG. 14 is a schematic diagram illustrating a specified state of a ground surface by an operator.

As illustrated in a top diagram in FIG. 14, in the case of manual performance, the operator specifies a position which is clearly a ground surface, in an image that is displayed on data display section 80. Then, as illustrated in a middle diagram in FIG. 14, data processing section 70 creates a reference circle having a predetermined radius with the specified position (point) at a center. Then, as illustrated in a bottom diagram in FIG. 14, data processing section 70 detects an overlap of point data p existing on the laser lateral lines, and selects a plurality of pieces of point data p included in the reference circle.

Figure 15A:
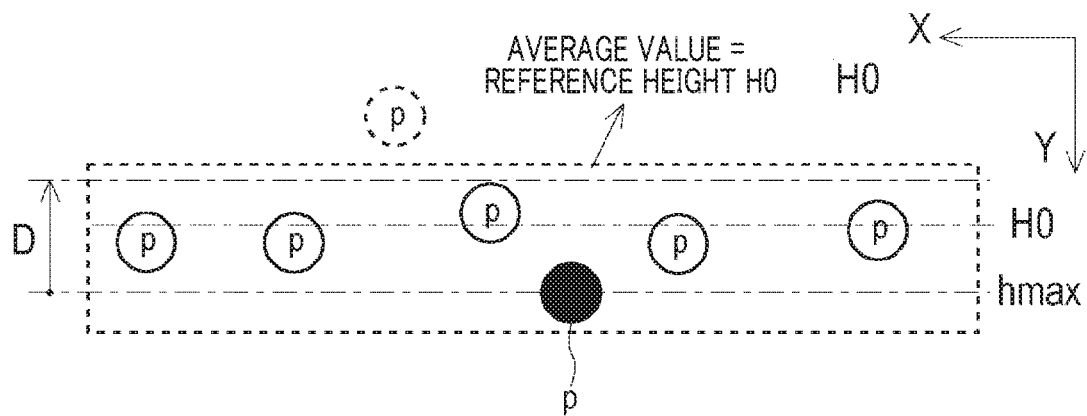
FIGS. 15A and 15B are explanatory diagrams of a calculation method of a reference height at a time of specification of a ground surface, where

Then, as illustrated in FIG. 15A, data processing section 70 extracts point data p with distance h, which is maximum distance hmax, from the selected plurality of pieces of point data p. Point data p with maximum distance hmax is expected to be point data p that is present at a lowest position. Data processing section 70 extracts point data p, separation amount D of distance h of which is within a specific range (in the present embodiment, 7 cm or less) with reference to maximum distance hmax, and calculates an average value of distances h of extracted pieces of point data p. Data processing section 70 estimates that the average value calculated in this manner is distance h to ground surface F, and thus determines the height of ground surface F (hereinafter, referred to as reference height H0).

Then, data processing section 70 calculates elevation value H of point data p from distance h and reference height H0. As illustrated in FIG. 10, elevation value H is a height of point data p from reference height H0.

Guide information display apparatus 50 is configured to create guide information GD on the basis of reference height H0 of ground surface F that is acquired with high accuracy by the processes described above. Accordingly, guide information display apparatus 50 may accurately calculate the shapes of suspended load W and grounded object C existing in the periphery of suspended load W on the basis of the height of ground surface F.

Next, a case of automatically estimating ground surface F will be described.

A configuration is described above according to which an operator specifies ground surface F, but guide information display apparatus 50 may also be configured to automatically estimate ground surface F by data processing section 70.

Figure 15B:
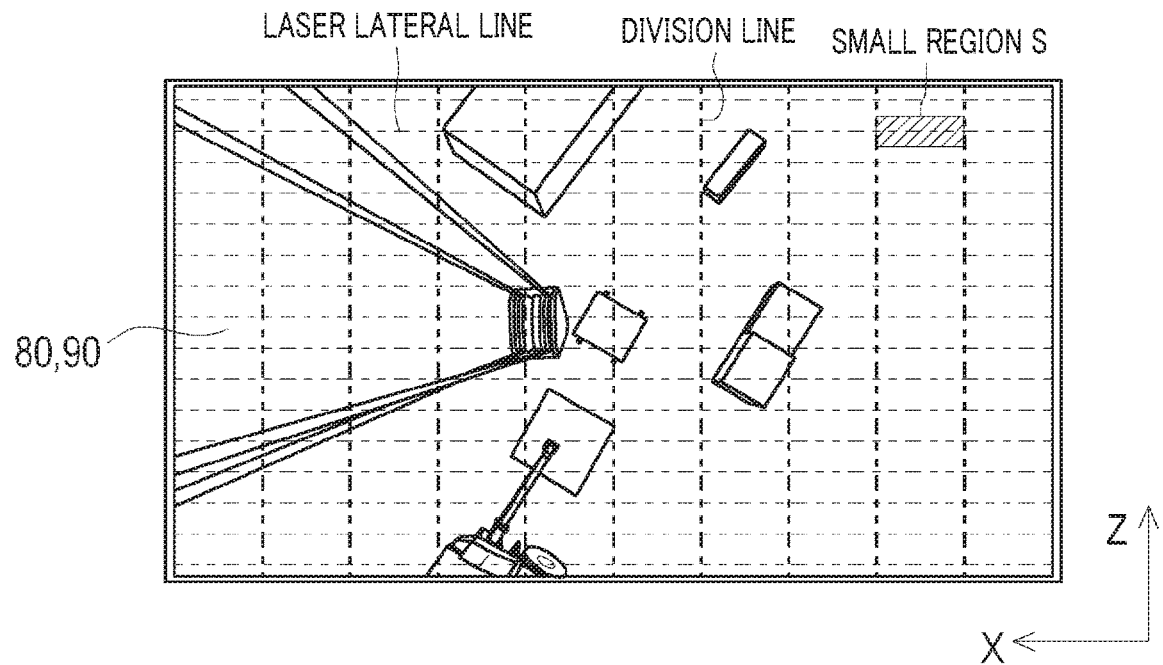

As illustrated in FIG. 15B, in the case of automatically estimating ground surface F by data processing section 70, data processing section 70 divides suspended load region WA into a plurality (in the present embodiment, 160 pieces) of small regions S having a same area.

Next, data processing section 70 extracts point data p with greatest distance h (that is, distance h is maximum distance hmax) from each small region S, and as illustrated in FIG. 15A, extracts point data p, separation amount D of distance h of which is within a specific range (in the present embodiment, separation amount D of 7 cm or less) with maximum distance hmax as a reference.

Next, data processing section 70 calculates, for each small region S, the average value of distances h of extracted pieces of point data p. Data processing section 70 automatically estimates reference height H0 of ground surface F in each small region S from the average value of distances h calculated in the above manner.

Alternatively, data processing section 70 further averages, among all small regions S, the average values of distances h calculated for respective small regions S, and automatically estimates reference height H0 of ground surface F of suspended load region WA from such an average value. In this case, data processing section 70 takes, as a reference, a maximum value among the average values of distances h of small regions S, and calculates reference height H0 using only small regions S, separation amounts D of which are at or smaller than a predetermined threshold with respect to the maximum value.

As illustrated in FIG. 12, in the data processing by data processing section 70, a "plane estimation process" is then performed (STEP-104). Data processing section 70 estimates top surfaces of suspended load W and grounded object C, which are measurement target objects existing in suspended load region WA, by a following top surface estimation method.

When point cloud data P for one frame is plotted on suspended load region WA represented in the XYZ coordinate system, it is shown as FIG. 13A. When such point cloud data P in suspended load region WA is schematically illustrated, it is as shown in a top diagram in FIG. 16.

(Point Cloud Data Acquisition Step)

Data processing section 70 first acquires such point cloud data P for one frame. Point cloud data P is acquired from suspended load region WA including suspended load W and grounded object C, which are measurement target objects, from above suspended load W and grounded object C.

(Grouping Step)

Figure 13B:
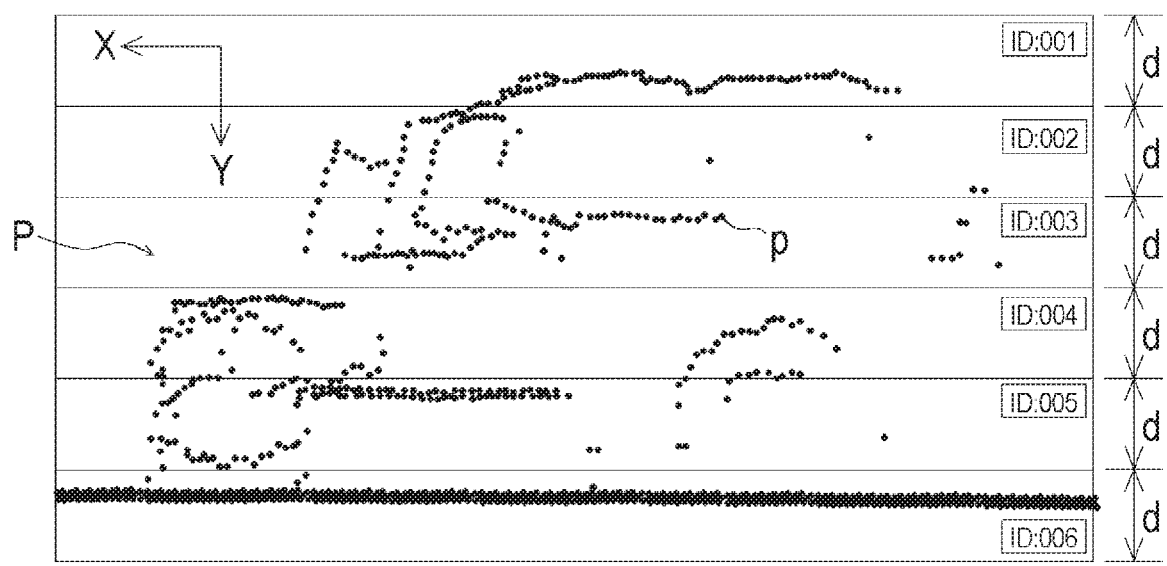
Figure 16:
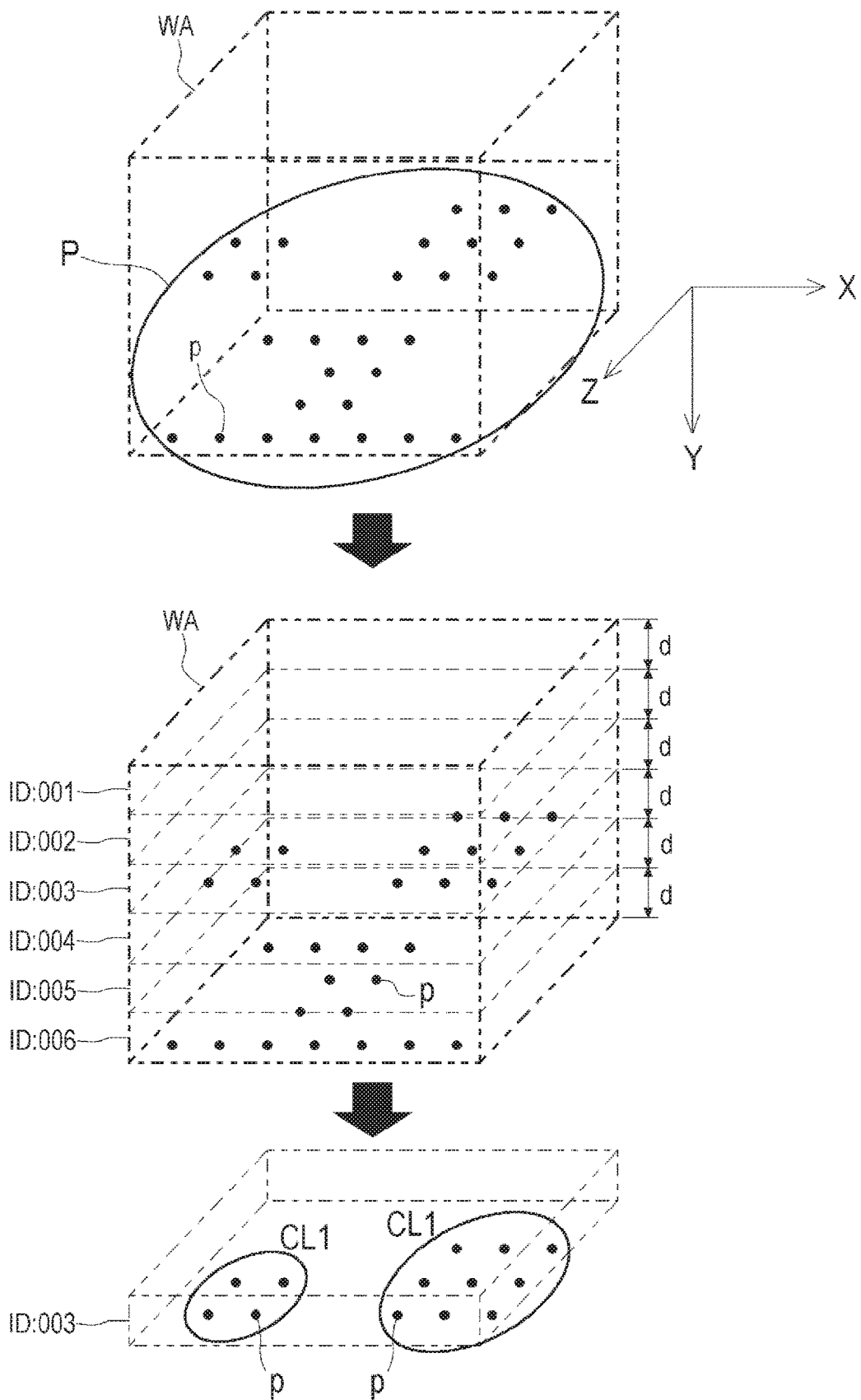
FIG. 16 is an explanatory diagram of a creation method of a planar cluster.

Data processing section 70 divides point cloud data P, as illustrated in the top diagram in FIG. 16, acquired from suspended load region WA into layers having predetermined thickness d in the Y-axis direction, as illustrated in a middle diagram in FIG. 16, and groups point cloud data P into a plurality of groups (see FIG. 13B).

At this time, data processing section 70 assigns an individual group ID (in this case, ID: 001 to 006) to each of the divided groups, and associates each piece of point data p to a group ID.

(Top Surface Estimation Step)

Then, data processing section 70 estimates a plane for each group using a plurality of pieces of point data p included in the group. The "plane" here is an upward plane of each of suspended load W and grounded object C, or in other words, a "top surface" of each of suspended load W and grounded object C.

In the following, the top surface estimation step will be specifically described.

Figure 17:
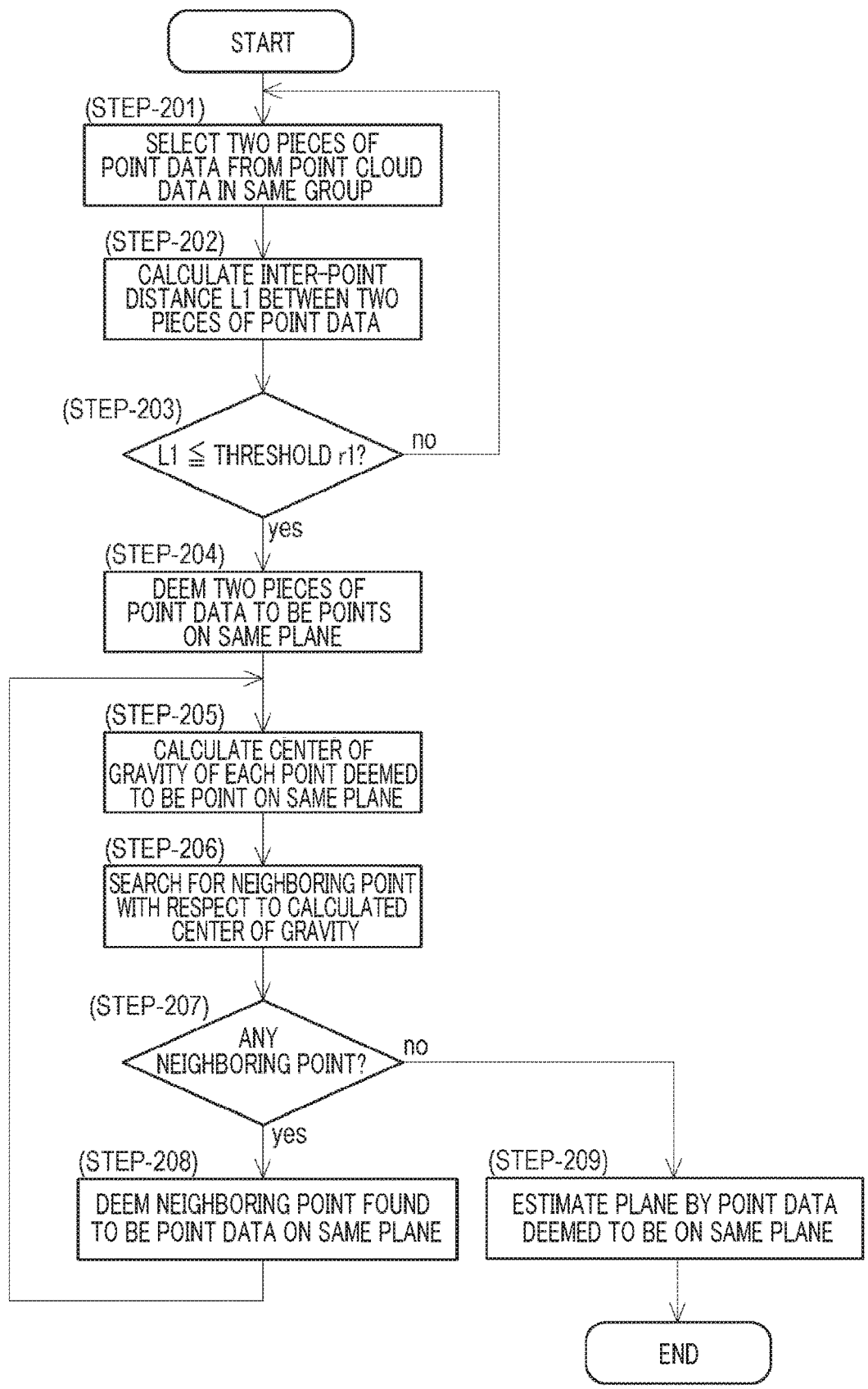
FIG. 17 is a flow diagram illustrating a plane estimation process.
Figure 18:
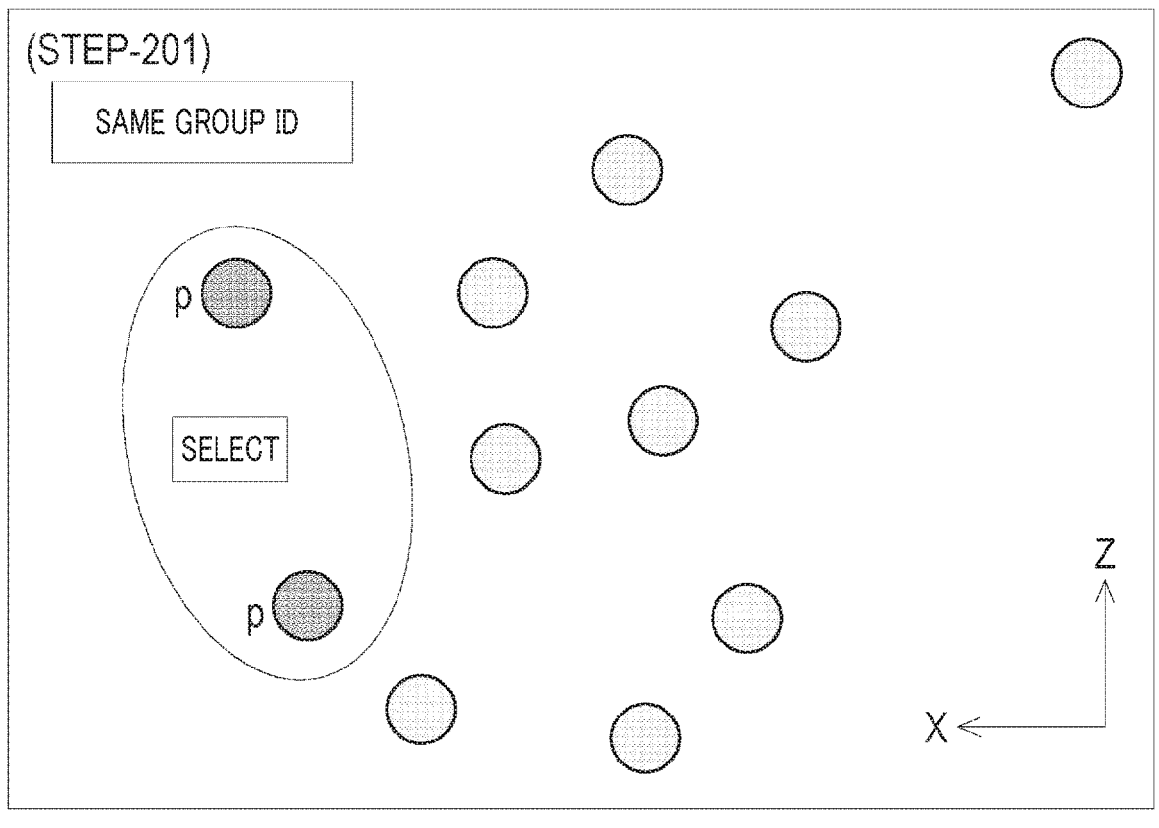
FIG. 18 is an explanatory diagram of the plane estimation process (STEPS-201 and 202)
Figure 18:
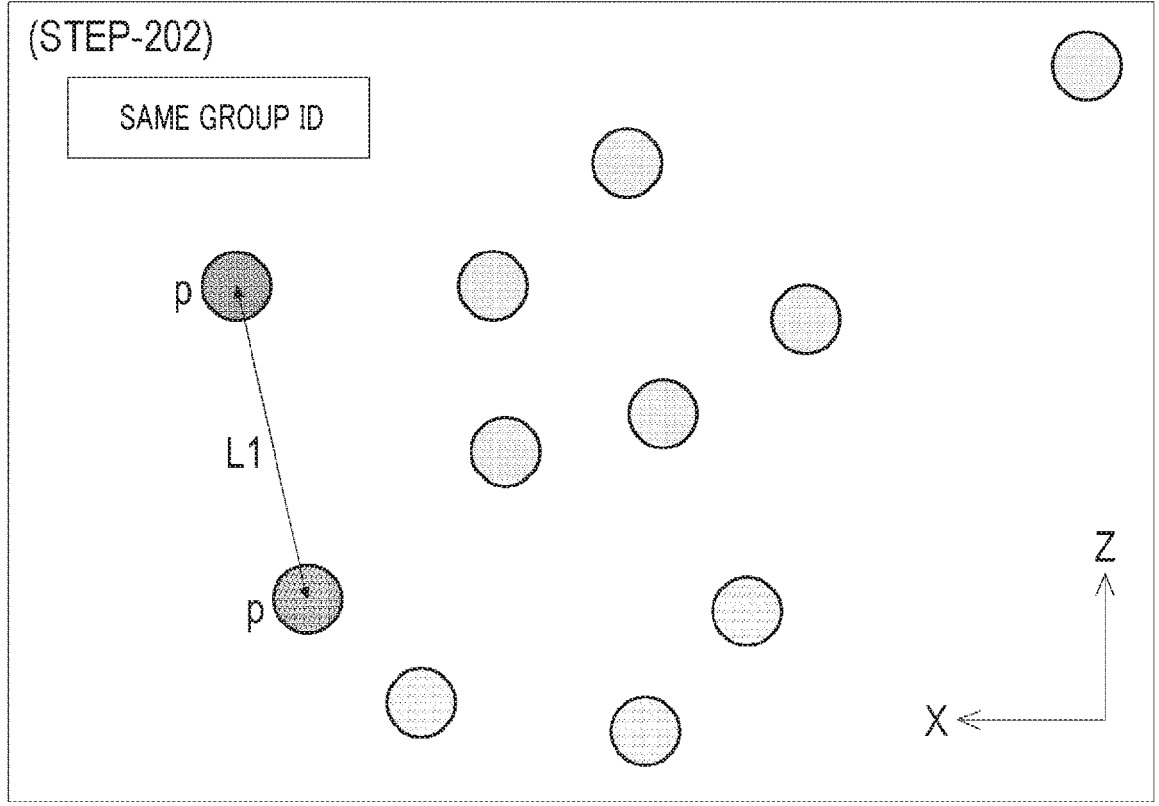

First, as illustrated in FIG. 17 and a top diagram in FIG. 18, data processing section 70 selects two pieces of point data p, p from a plurality of pieces of point data p, p, . . . included in a same group (two-point selection step: STEP-201).

Then, as illustrated in FIG. 17 and a bottom diagram in FIG. 18, data processing section 70 calculates an inter-point distance L1 between the selected two pieces of point data p, p (inter-point distance calculation step: STEP-202).

Figure 19:
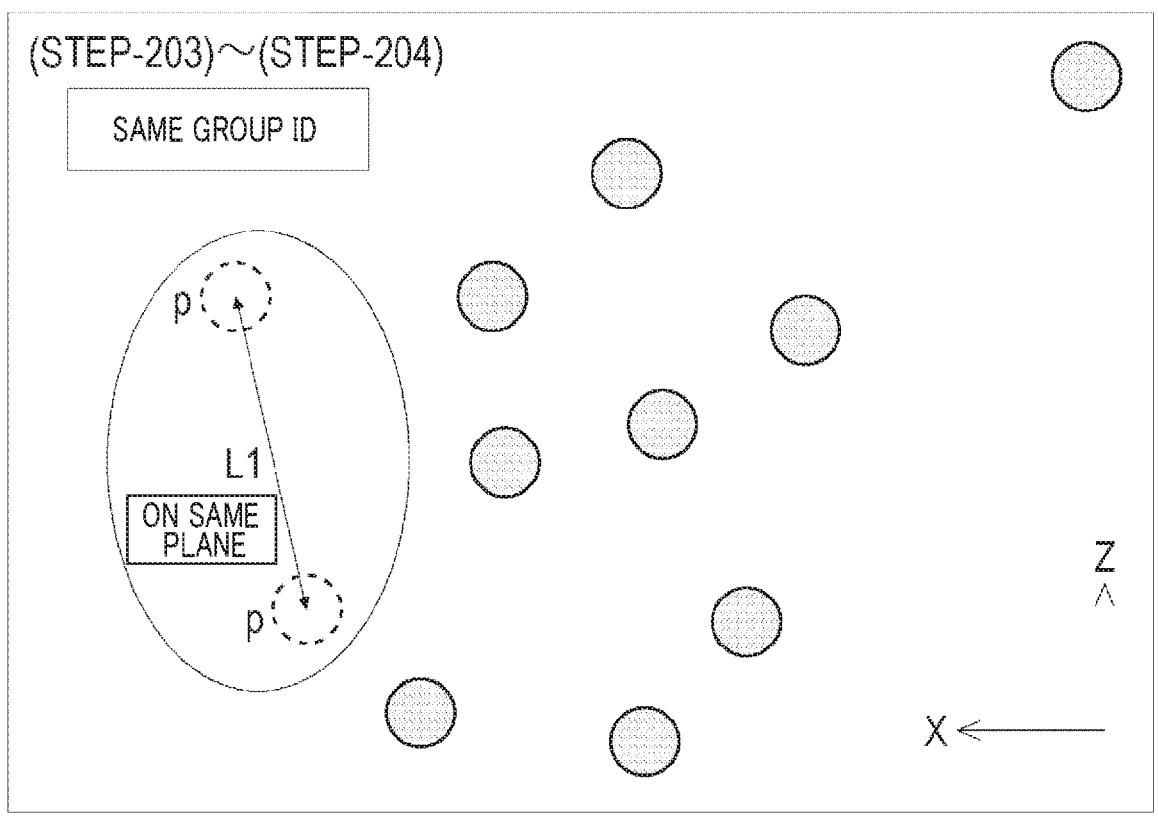
FIG. 19 is an explanatory diagram of the plane estimation process (STEPS-203 to 205)
Figure 19:
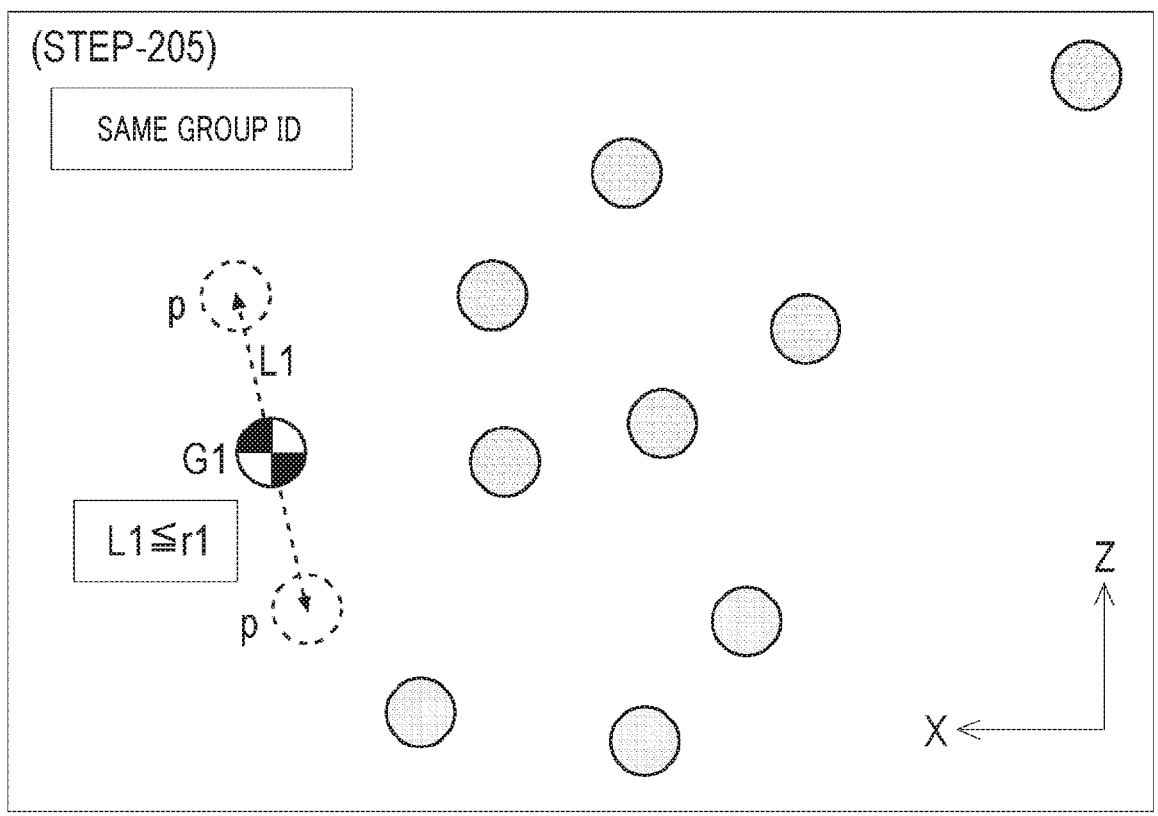

Next, as illustrated in FIG. 17 and a top diagram in FIG. 19, if inter-point distance L1 is at or smaller than predetermined threshold r1 (STEP-203), data processing section 70 deems the two points (two pieces of point data p, p indicated by dotted lines) to be on a same plane (two-points-on-plane deeming step: STEP-204). Then, as illustrated in FIG. 17 and a bottom diagram in FIG. 19, data processing section 70 calculates center of gravity G1 of each point that is deemed to be on the same plane (in this case, each of the selected two points; center-of-gravity calculation step: STEP-205). If "no" is determined in (STEP-203), two points are newly selected by returning to (STEP-201).

Figure 20:
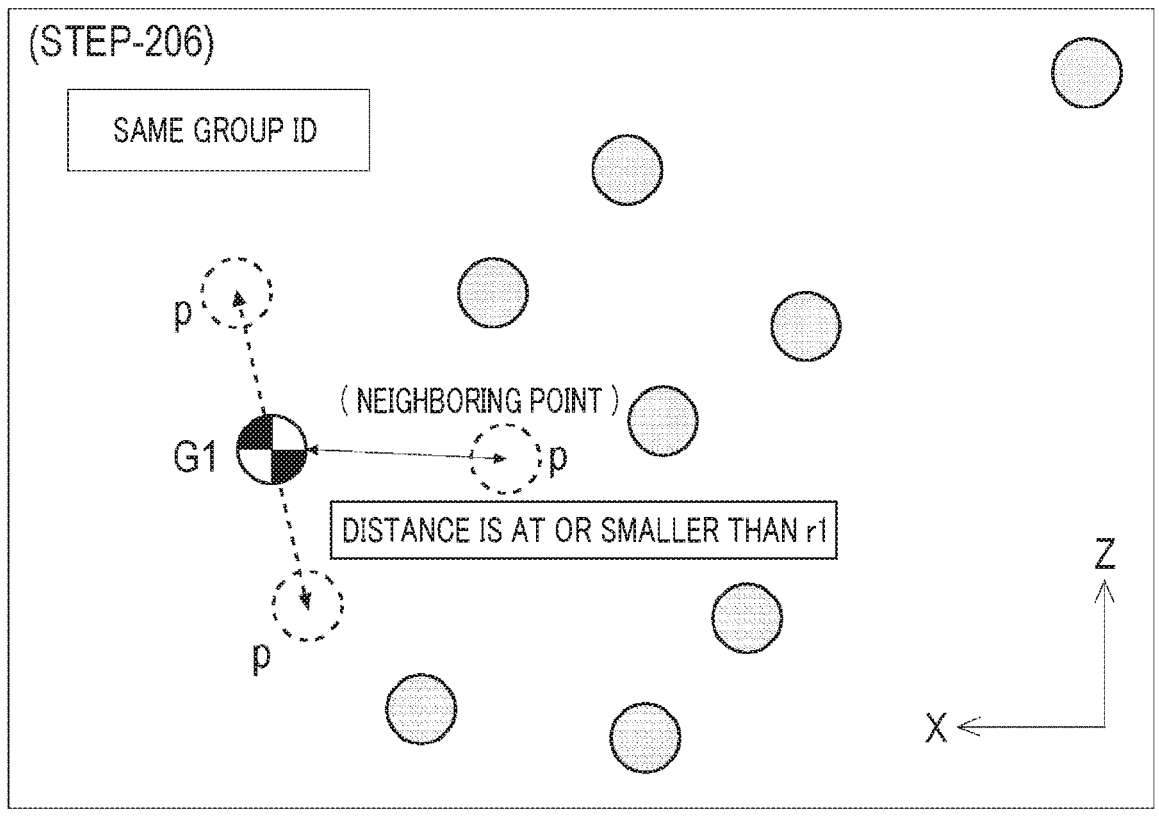
FIG. 20 is an explanatory diagram of the plane estimation process (STEPS-206 to 208)
Figure 20:
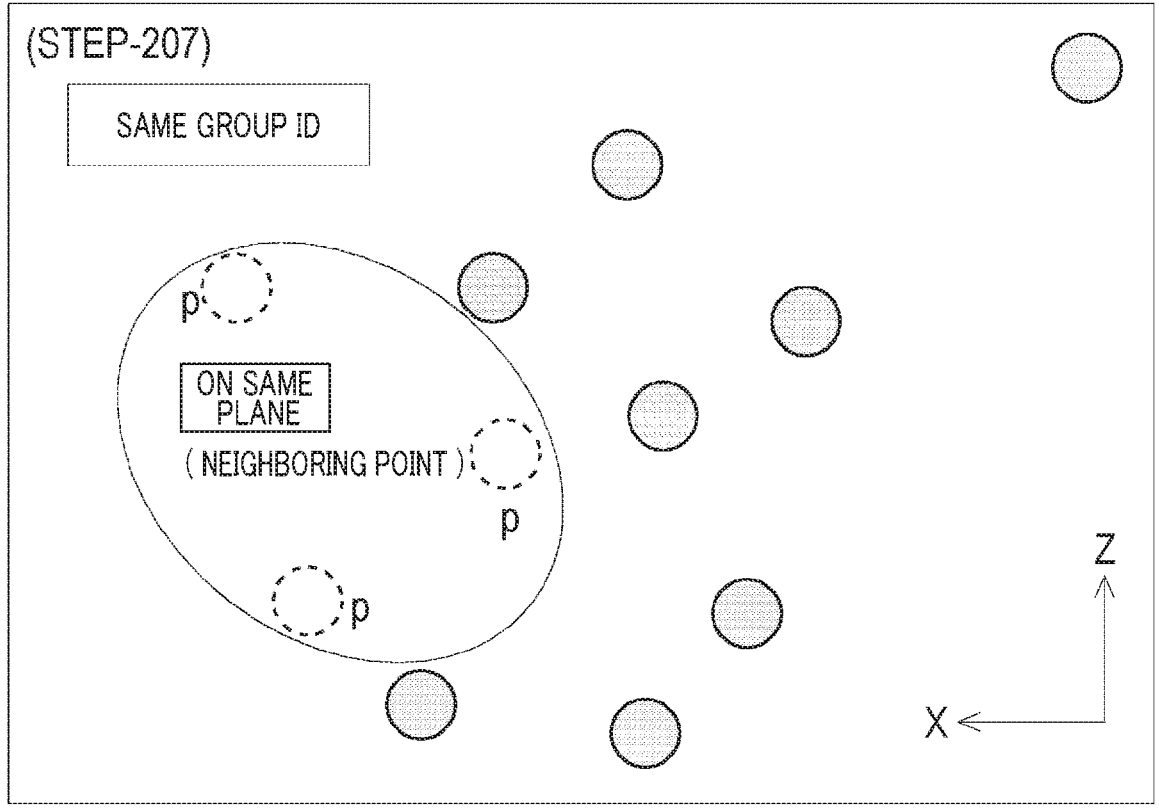

Next, as illustrated in FIG. 17 and a top diagram in FIG. 20, data processing section 70 searches for point data p which is a neighboring point of the calculated center of gravity G1 (neighboring point search step: STEP-206). The "neighboring point" here is a point, the inter-point distance of which to center of gravity G1 is at or smaller than threshold r1.

Then, as illustrated in FIG. 17 and a bottom diagram in FIG. 20, when point data p which is a neighboring point is found (STEP-207), data processing section 70 deems that point data p in question, which is a neighboring point, is also on the same plane as the two pieces of point data p, p previously selected (neighboring-point-on-plane deeming step: STEP-208).

Figure 21:
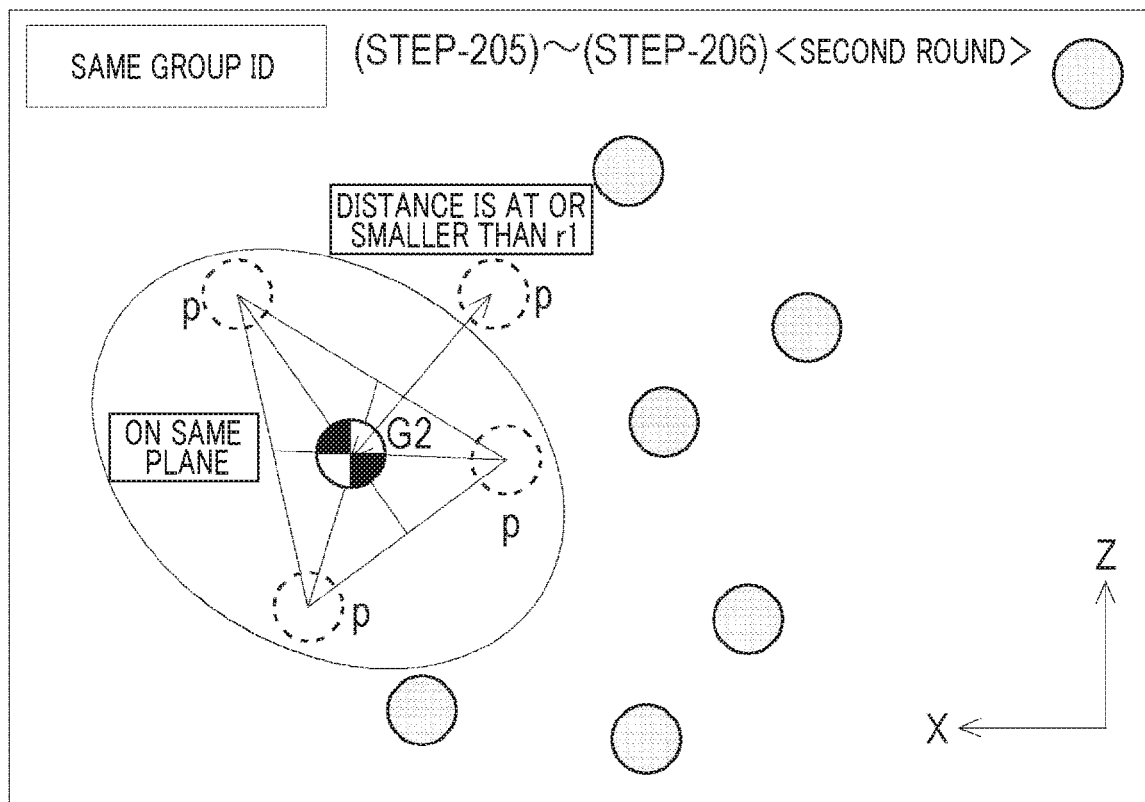
FIG. 21 is an explanatory diagram of the plane estimation process (STEPS-206 to 208 (2nd round))
Figure 21:
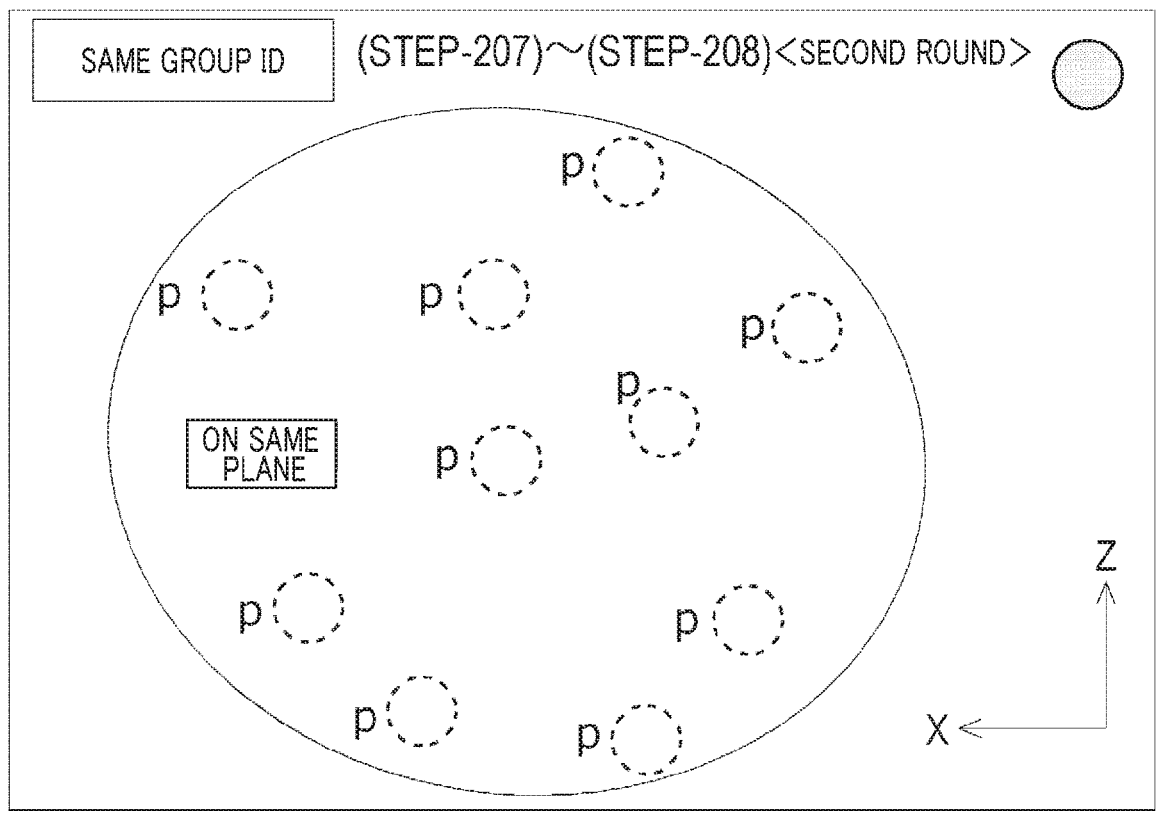

Then, as illustrated in FIG. 17 and a top diagram in FIG. 21, data processing section 70 returns to (STEP-205), and newly calculates center of gravity G2 from the points that are deemed to be on the same plane (in this case, three pieces of point data p, p, p indicated by dotted lines).

Data processing section 70 proceeds to (STEP-206), and further searches for point data p which is a neighboring point of center of gravity G2. Then, as illustrated in FIG. 17 and a bottom diagram in FIG. 21, if point data p which is a neighboring point is further found (STEP-207), data processing section 70 deems that point data p in question, which is a neighboring point, is also on the same plane as each point previously selected point (STEP-208).

Then, data processing section 70 searches for a neighboring point while calculating a new center of gravity, and repeats the processes (STEP-205) to (STEP-208) in the order mentioned every time point data p which is a neighboring point is detected. The processes are repeated until point data p which is a neighboring point is no longer detected.

Figure 22:
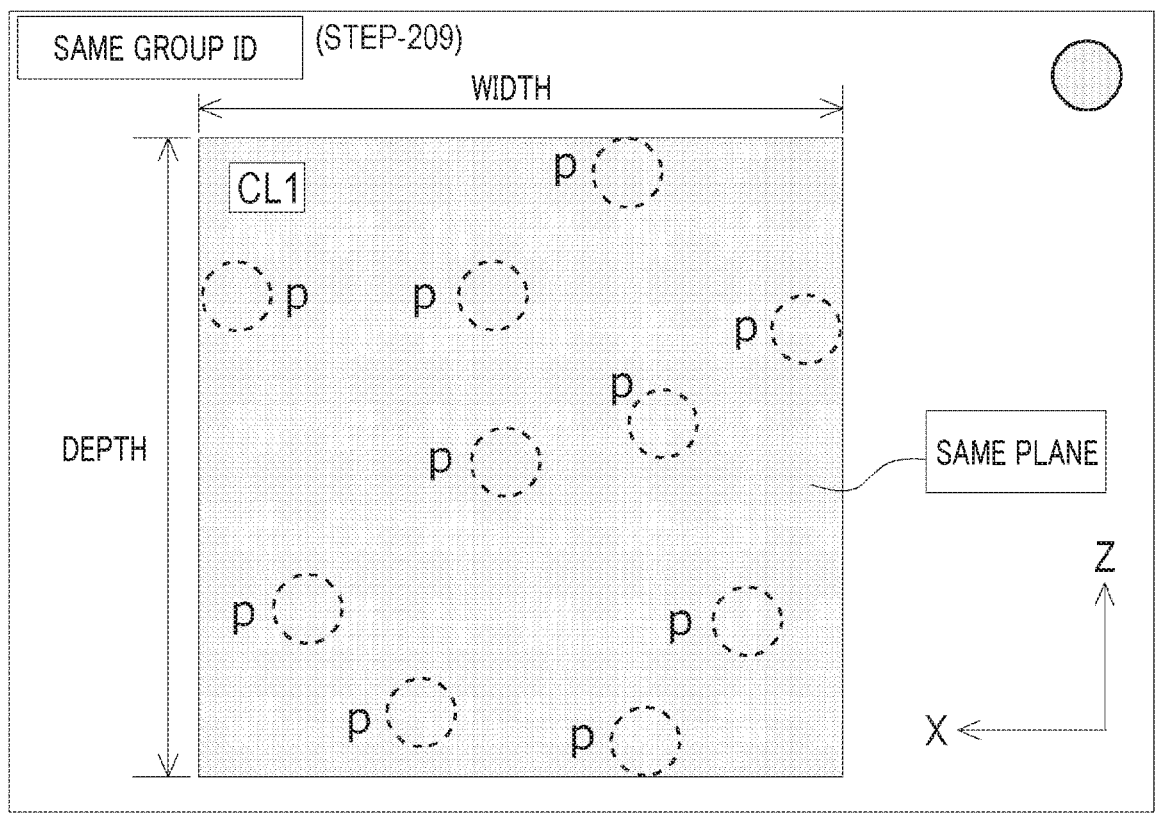
FIG. 22 is an explanatory diagram of the plane estimation process (a top surface estimated state)

Then, as illustrated in FIGS. 17 and 22, if no new neighboring point is found, data processing section 70 determines "no" in (STEP-207), performs clustering of a subset (cluster) of pieces of point data p that are deemed to be on the same plane, and estimates a plane (STEP-209). The "clustering" here refers to a process of separating point cloud data P, which is a set of point data p, into clusters such that pieces of point data p included in each cluster have a common property of being on the same plane.

Data processing section 70 sets planar clusters CL1 by separating point cloud data P into pieces of point data p which are deemed to be on the same plane (see FIG. 16, bottom diagram). A plane (that is, the "top surface" of suspended load W or grounded object C) may be defined using each piece of point data p belonging to planar cluster CL1. Additionally, a plurality of planar clusters CL1 are possibly present in a group assigned with one group ID.

Then, data processing section 70 estimates a "width" of the plane from a maximum value and a minimum value of the X coordinate of pieces of point data p belonging to planar cluster CL1, and estimates a "depth" of the plane from a maximum value and a minimum value of the Z coordinate. That is, according to the top surface estimation method for suspended load W and grounded object C described in the present embodiment, a "width" of the top surface is estimated by data processing section 70 from the inter-point distance between two pieces of point data p, p that are most separate in a width direction (X-axis direction) of the top surface, among a plurality of pieces of point data p that are deemed to be on the same plane (in other words, belonging to the same planar cluster CL1), and a "depth" of the top surface is estimated by data processing section 70 from the inter-point distance between two pieces of point data p, p that are most separate in a depth direction (Z-axis direction) of the top surface, among such plurality of pieces of point data p.

Data processing section 70 defines a plane from estimated planar cluster CL1 in such a manner. Additionally, a plane to be defined may be a polygon other than a rectangle.

That is, the top surface estimation method for suspended load W and grounded object C described in the present embodiment includes steps that are performed by data processing section 70, the steps including a two-point selection step (STEP-201) of extracting point cloud data P included within predetermined thickness d of suspended load region WA in the vertical direction, from point cloud data P, acquired by laser scanner 62 from above suspended load W and grounded object C, of suspended load region WA including suspended load W and grounded object C, and selecting two pieces of point data p, p from extracted point cloud data P, an inter-point distance calculation step (STEP-202) of calculating inter-point distance L1 between the selected two pieces of point data p, p, a two-points-on-plane deeming step (STEP-204) of deeming the two pieces of point data p, p to be two points that are on a same plane, in a case where the calculated inter-point distance L1 is at or smaller than predetermined threshold r1, a center-of-gravity calculation step (STEP-205) of calculating center of gravity G1 (or center of gravity G2) of points that are deemed to be on the same plane, a neighboring point search step (STEP-206) of searching for a neighboring point that is point data p, a distance of which to center of gravity G1 (or center of gravity G2) is at or smaller than threshold r1, and a neighboring-point-on-plane deeming step (STEP-208) of deeming, when the neighboring point is found, that the neighboring point is a point that is on the same plane as the points that are deemed to be on the same plane, where the center-of-gravity calculation step (STEP-205), the neighboring point search step (STEP-206), and the neighboring-point-on-plane deeming step (STEP-207) are repeated in the order mentioned every time the neighboring point is detected, a plurality of pieces of point data p that are deemed to be on the same plane are acquired, and planar clusters CL1 representing the top surfaces of suspended load W and grounded object C are estimated on the basis of the plurality of pieces of point data p (STEP-209).

With the top surface estimation method as described above, the top surfaces of suspended load W and grounded object C may be estimated on the basis of only point cloud data P corresponding to the top surfaces, acquired by laser scanner 62. Accordingly, with the top surface estimation method described in the present embodiment, the top surfaces of suspended load W and grounded object C may be estimated in a short time on the basis of point cloud data P acquired by laser scanner 62, and thus, estimation of the top surfaces of suspended load W and grounded object C in real time may be achieved.

Furthermore, with the top surface estimation method as described above, the top surfaces of suspended load W and grounded object C may be estimated without using a statistical method, and the amount of calculation required to estimate the top surfaces of suspended load W and grounded object C may be reduced compared to a case of using a statistical method. Accordingly, with the top surface estimation method described in the present embodiment, the top surfaces of suspended load W and grounded object C may be estimated in a shorter time on the basis of point cloud data P acquired by laser scanner 62.

Additionally, a case is described with respect to the top surface estimation method for suspended load W and grounded object C described in the present embodiment, according to which crane 1 is provided with data acquisition section 60 at top boom member 22f of telescopic boom 22, and point cloud data P for suspended load W, grounded object C and ground surface F is acquired by laser scanner 62 from above suspended load W, but the top surface estimation method for a measurement target object according to the present invention is not limited to be applied to a case where the suspended load of the crane and objects around the suspended load are taken as the measurement target objects.

That is, the top surface estimation method for a measurement target object according to the present invention may be widely applied, for example, to cases where the laser scanner is provided at a boom distal end portion of a work vehicle (such as an aerial work platform) including a boom or on a drone, and point cloud data of a measurement target object vertically below is acquired from above and the top surface of the measurement target object is estimated on the basis of the acquired point cloud data.

Next, data processing section 70 combines estimated planar clusters CL1 (top surfaces).

Figure 23:
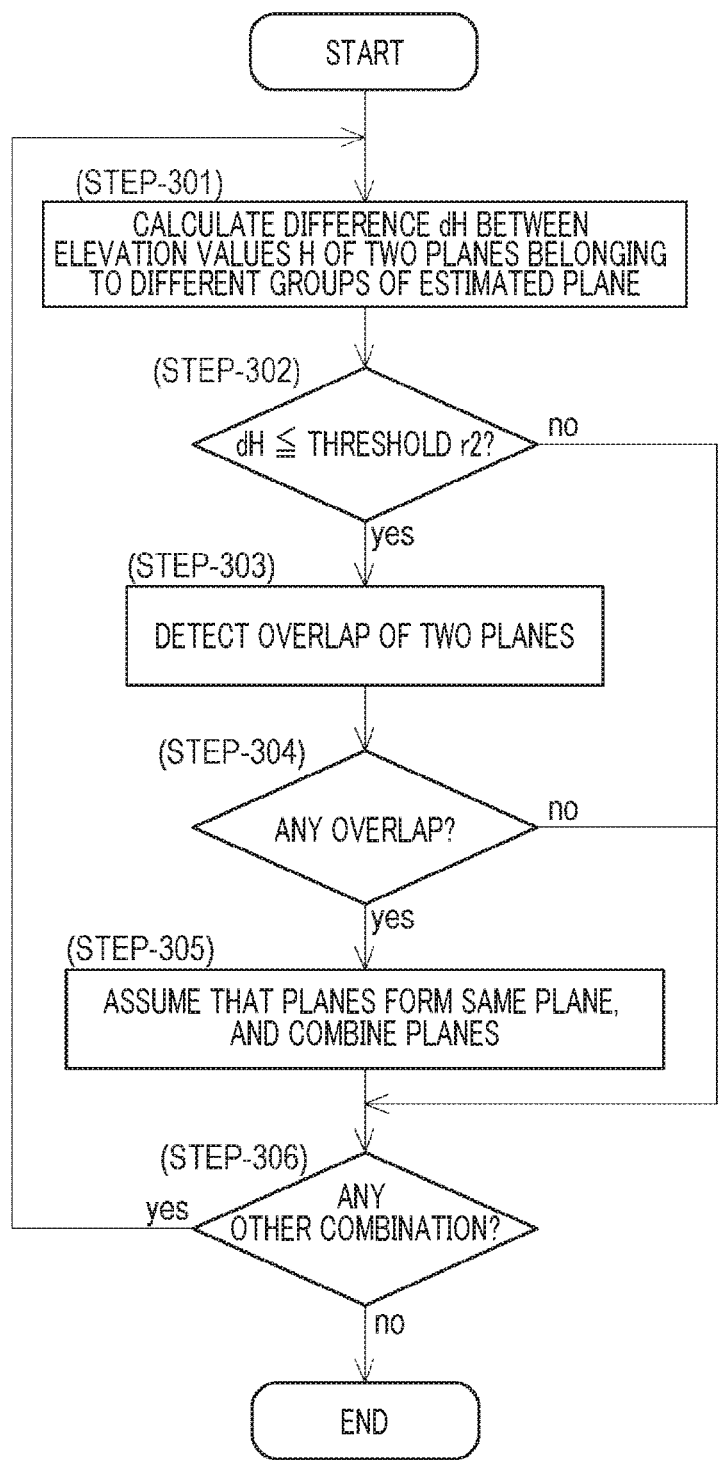
FIG. 23 is a flow diagram of a combining method of planes belonging to different groups.
Figure 24:
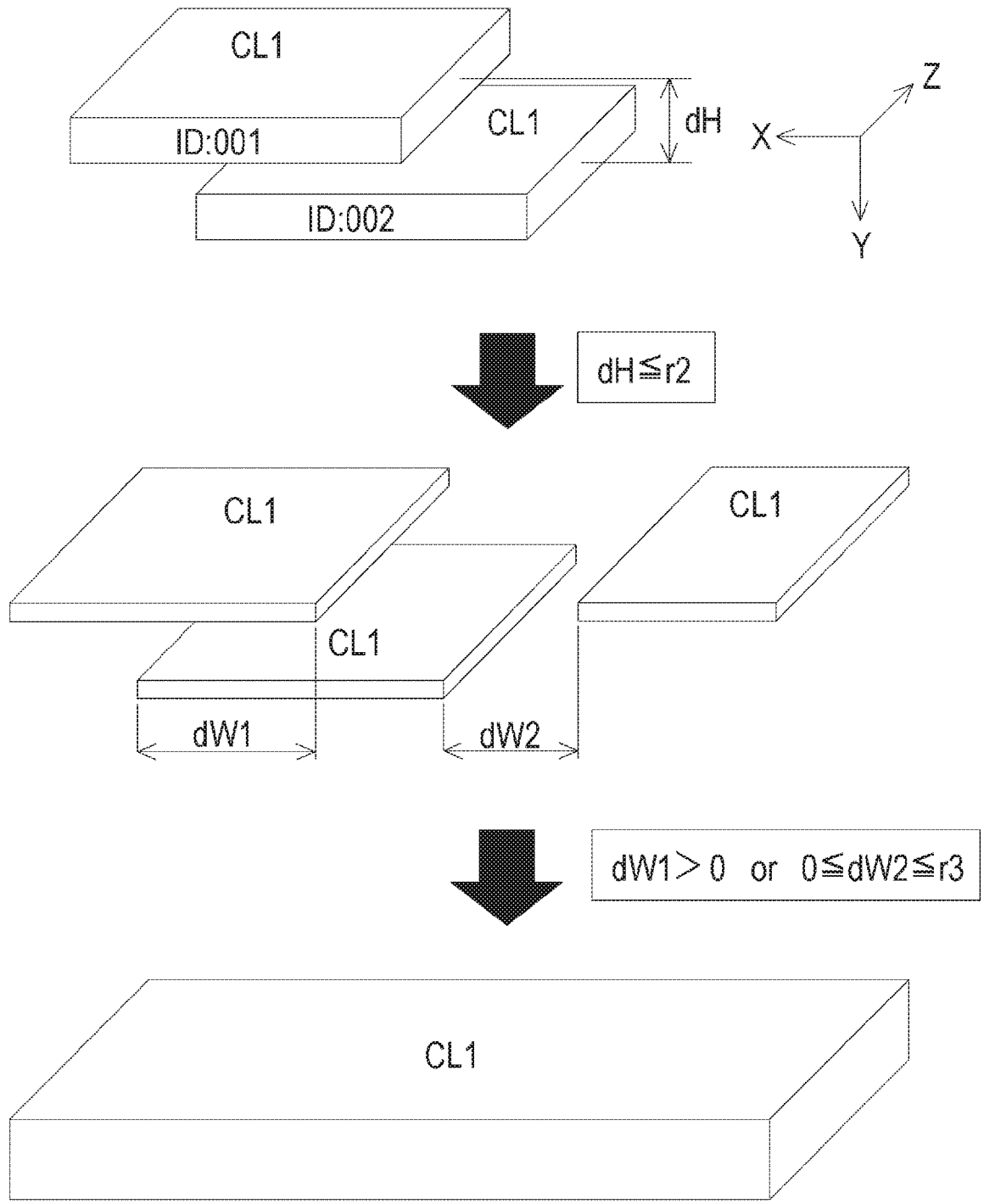
FIG. 24 is an explanatory diagram of the combining method of planes belonging to different groups.

As illustrated in FIG. 23 and a top diagram in FIG. 24, data processing section 70 selects, from estimated planar clusters CL1, two planar clusters CL1, CL1 assigned with different group IDs, and calculates difference dH between elevation values H of planar clusters CL1 (STEP-301: elevation value difference calculation step). Here, planar cluster CL1 belonging to one group and planar cluster CL1 belonging to another group other than the one group are selected. Of two planar clusters CL1, CL1 selected here, one planar cluster CL1 is a top surface that is used as a reference for combining (reference top surface), and the other planar cluster CL1 is a top surface existing near the reference top surface (neighboring top surface).

Here, data processing section 70 searches for a combination for which difference dH is at or smaller than threshold r2 (STEP-302). Elevation value H of planar cluster CL1 here is an average value of elevation values H of pieces of point data p belonging to planar cluster CL1.

Next, as illustrated in FIG. 23 and a middle diagram in FIG. 24, when a combination of planar clusters CL1 for which difference dH between elevation values H is at or smaller than threshold r2 is detected, data processing section 70 detects an overlap dW of planar clusters CL1, CL1 in question in the X-axis direction (STEP-303: overlap detection step). The "overlap" here is a degree of overlap or a degree of separation of planes defined by planar clusters CL1 in the X-axis direction, and as illustrated in FIGS. 23 and 24, an "overlap" is detected in a case where amount of overlap dW1 is detected with respect to the "width" (dW1>0), or in a case where amount of separation dW2 is at or smaller than predetermined threshold r3 (0≤dW2≤r3).

Then, as illustrated in FIGS. 23 and 24, in the case where an "overlap" is detected (STEP-304), data processing section 70 deems that pieces of point data p belonging to planar clusters CL1, CL1 in question are present on a same plane, and updates planar cluster CL1 which is the reference top surface by combining planar cluster CL which is the neighboring top surface with planar cluster CL1 which is the reference top surface (STEP-305: plane combining step).

As illustrated in FIG. 23, data processing section 70 repeats the processes described above until there are no more combinations of planar clusters CL1, CL1 satisfying the condition (STEP-306), and estimates a plane that is present across a plurality of groups.

That is, after the plane combining step (STEP-305), data processing section 70 newly searches for planar cluster CL1 which is a neighboring top surface, difference dH of elevation value H of which is at or smaller than threshold r2 with respect to updated planar cluster CL1 which is the reference top surface, and in the case where new planar cluster CL1 which is a neighboring top surface, difference dH of elevation value H of which is at or smaller than threshold r2, is found, the overlap detection step (STEPS-303, 304) and the plane combining step (STEP-305) are further performed in the order mentioned.

Then, data processing section 70 outputs the combined plane (that is, planar cluster CL1) obtained by the process described above.

Planes that are defined by planar clusters CL1 are upward planes of suspended load W and grounded object C, or in other words, the top surfaces of suspended load W and grounded object C.

With the estimation method for a plane as described above, a plane may be estimated without using a normal vector of point cloud data P. Accordingly, there is a characteristic that the amount of calculation may be small compared to a case of estimating the plane by using a normal vector of point cloud data P.

Furthermore, with the estimation method for a plane as described above, by estimating the top surfaces of suspended load W and grounded object C, three-dimensional shapes of suspended load W and grounded object C may be grasped without acquiring point data p of side surfaces of suspended load W and grounded object C.

As illustrated in FIG. 12, in data processing by data processing section 70, a "clustering process for a same region" is next performed (STEP-105). The "clustering" here is a process of separating point cloud data P, which is a set of data, into clusters, and causing pieces of point data p included in a cluster to have a common property of being in a "same region".

The "clustering process for a same region" that is performed here is a process of clustering created planar clusters CL1 (planes), from a different point of view, whether planar clusters CL1 exist in the "same region" or not, regardless of whether planar clusters CL1 belong to the same plane or not.

Figure 25:
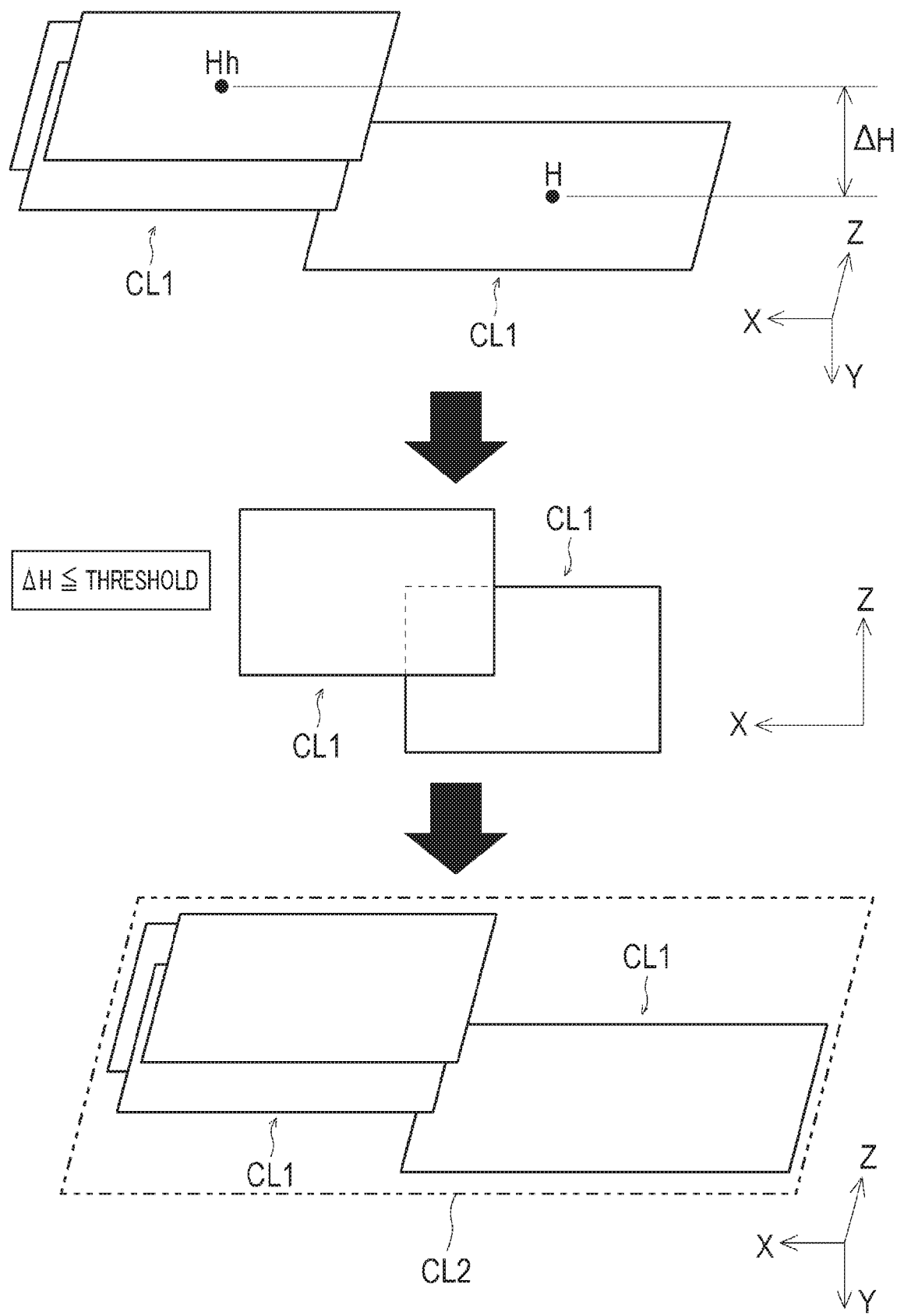
FIG. 25 is an explanatory diagram of a clustering process for a same region.

Specifically, as illustrated in a top diagram in FIG. 25, data processing section 70 extracts planar cluster CL1 including point data p, elevation value H of which takes maximum value Hh, and planar cluster CL1 which is not combined with planar cluster CL1 in question. Then, data processing section 70 calculates difference ΔH between elevation values H of extracted planar clusters CL1, and then proceeds to next determination if difference ΔH is at or smaller than a predetermined threshold.

After proceeding to the next determination, data processing section 70 checks, as illustrated in a middle diagram in FIG. 25, an overlap in the Y-axis direction between two planar clusters CL1, CL1 for which difference ΔH is at or smaller than the predetermined threshold.

As illustrated in a bottom diagram in FIG. 25, in the case where two planar clusters CL1, CL1 are overlapped with each other when viewed along the Y-axis, data processing section 70 deems that planar clusters CL1, CL1 in question are in a "same region", and forms same-region cluster CL2 by planar clusters CL1, CL1 in question.

Then, data processing section 70 further searches for planar cluster CL1 including point data p, elevation value H of which takes maximum value Hh, and planar cluster CL1 which is not combined with planar cluster CL1 in question, and if planar cluster CL1 which is not yet combined is extracted, determination based on difference ΔH and checking of overlap in the Y-axis direction are performed, and if planar cluster CL1 matching the conditions described above exists, such planar cluster CL1 is further added to same-region cluster CL2 described above.

Data processing section 70 repeats the processes every time planar cluster CL1 which is not combined with planar cluster CL1 including point data p, elevation value H of which takes maximum value Hh, is found. Data processing section 70 forms same-region cluster CL2 by the processes as described above.

Pieces of point data p belonging to same-region cluster CL2 formed in such a manner are treated as forming one shape in the display of guide information GD described later, and guide frame GD1 is displayed in a manner enclosing same-region cluster CL2.

Figure 26A:
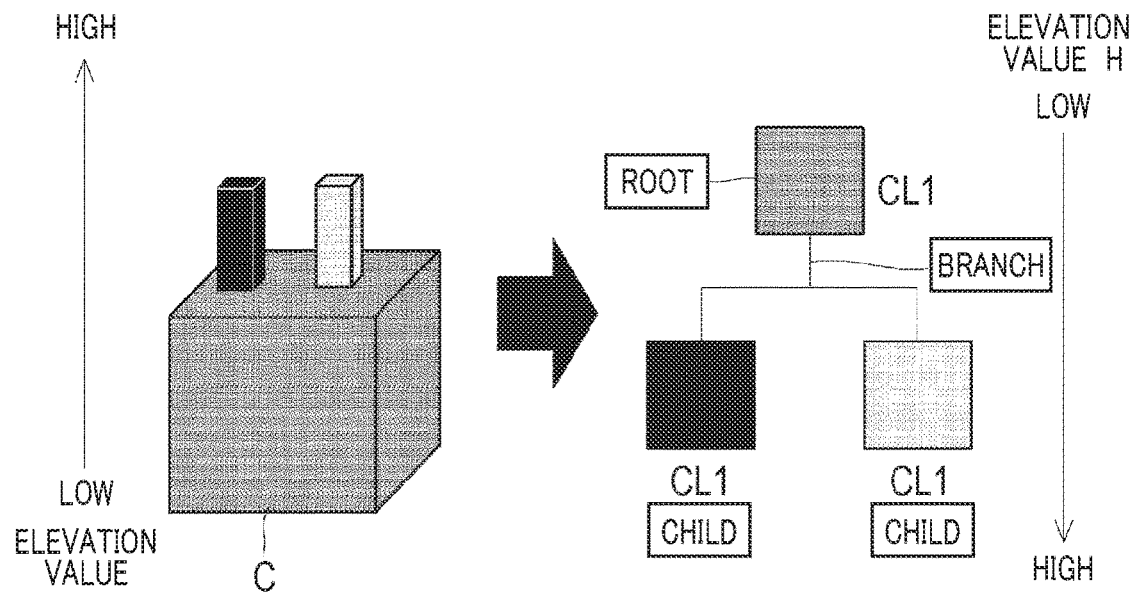
FIGS. 26A and 26B are explanatory diagrams of hierarchical clustering, where
Figure 26B:
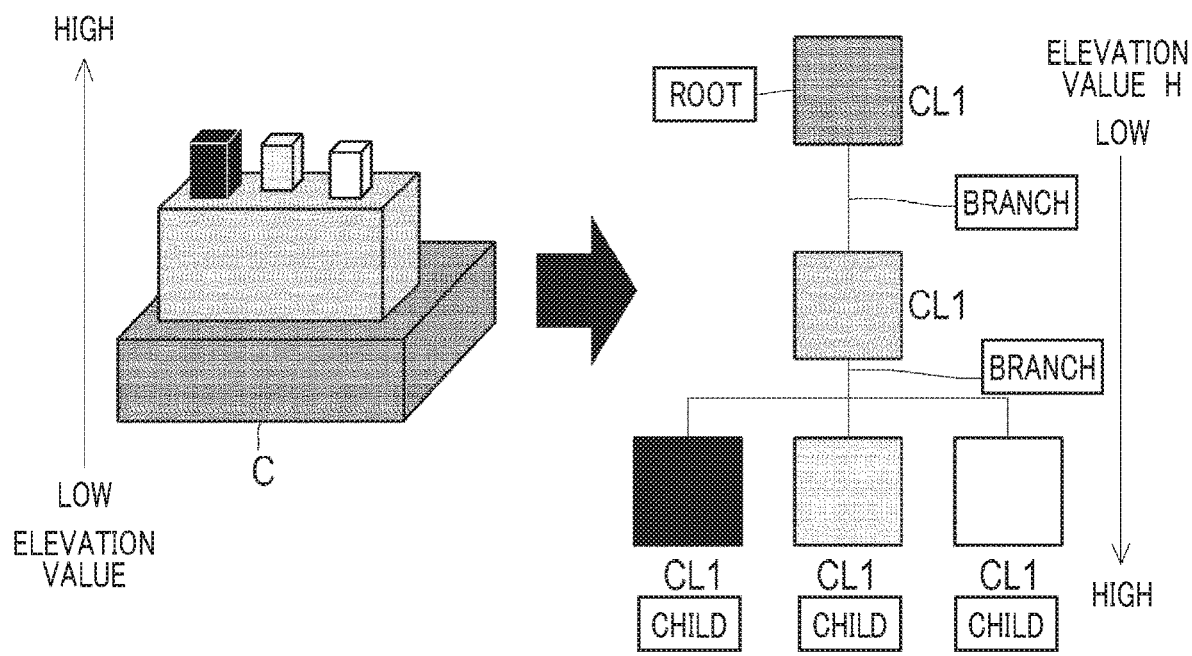

Additionally, the "clustering process for a same region" as described above is desirably hierarchical clustering that uses a tree structure based on elevation value, as illustrated in FIGS. 26A and 26B. In the "clustering process for a same region", data processing section 70 creates, for each grounded object C, a tree structure using elevation values H. Here, a description will be given of a case where hierarchical clustering that uses a tree structure is performed for grounded object C of a first example illustrated in FIG. 26A, and a case where hierarchical clustering that uses a tree structure is performed for grounded object C of a second example illustrated in FIG. 26B.

In the hierarchical clustering that uses a tree structure based on the elevation value, data processing section 70 sets planar cluster CL1, the average value of elevation values H of which is the smallest, as a "root". Furthermore, if there is planar cluster CL1 that overlaps planar cluster CL1 forming the "root" when viewed along the Y-axis direction, data processing section 70 forms a "branch" from the "root", and adds overlapping planar cluster CL1 at a tip of the "branch". Then, data processing section 70 sets planar cluster CL1, the average value of elevation values H of which is the greatest, as a "child".

A creation method of guide frame GD1 will now be described.

Data processing section 70 acquires the tree structure of grounded object C created in the "clustering process for a same region". Then, data processing section 70 acquires point data p included in each planar cluster CL1 forming the tree structure.

Figure 27:
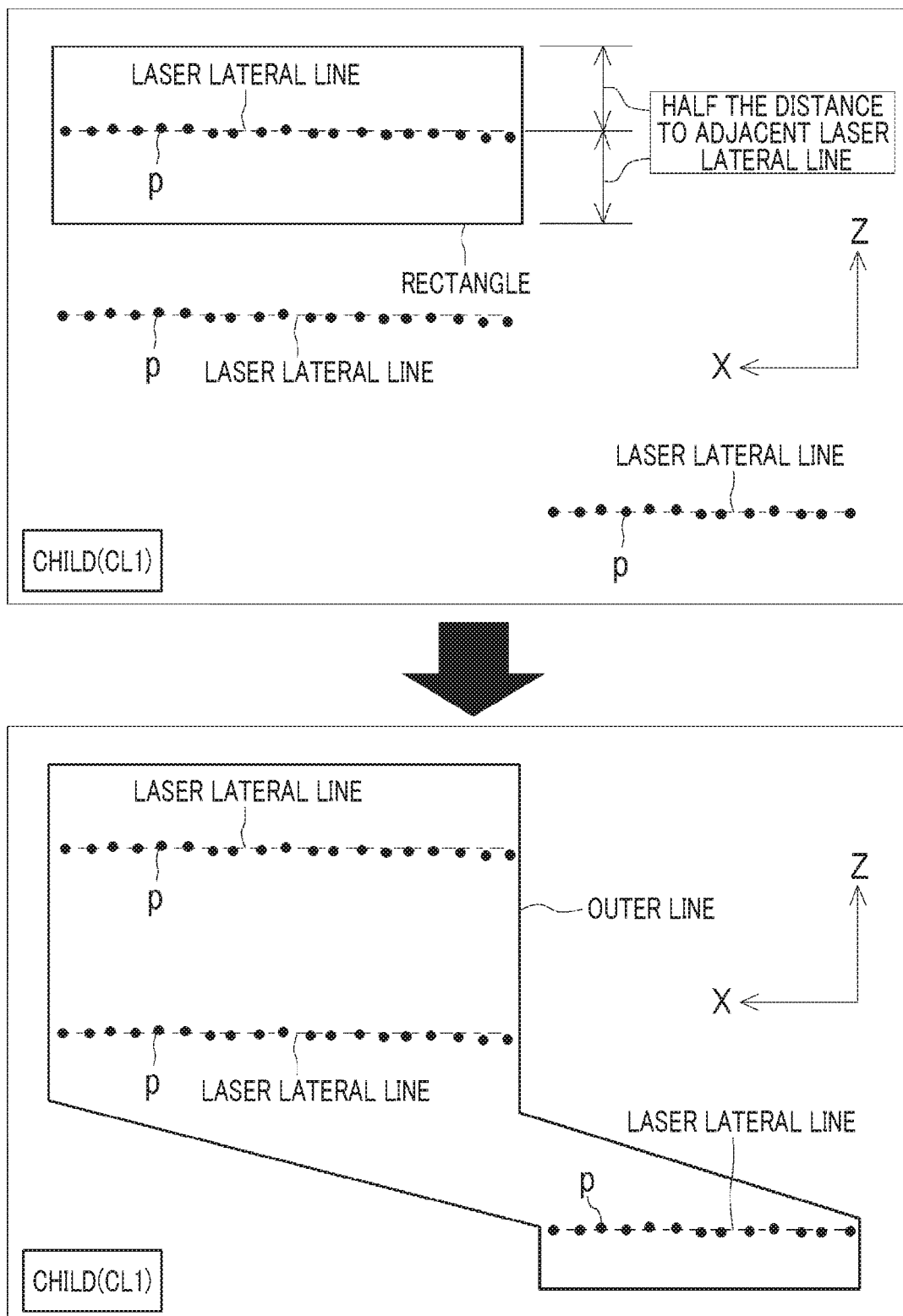
FIG. 27 is an explanatory diagram of a creation process of a guide frame.

Next, as illustrated in a top diagram in FIG. 27, data processing section 70 acquires, from pieces of point data p of "child" planar cluster CL1, each piece of point data p on the laser lateral line that is at a deepest position in the Z-axis direction. Then, data processing section 70 creates a rectangle that is shifted in the Z-axis direction by half the distance to the adjacent laser lateral line, and that has a width in the X-axis direction by which pieces of point data p can be enclosed.

Next, in the case where point data p exists on the laser lateral line that is adjacent to the created rectangle, data processing section 70 changes the shape of the rectangle to include all the pieces of point data p on the corresponding laser lateral line, and creates an outer line, as illustrated in a bottom diagram in FIG. 27.

Then, data processing section 70 searches for point data p on an adjacent laser lateral line until there is no point data p on a laser lateral line as a target, and repeats the processes described above.

Lastly, data processing section 70 creates an outer line that includes all planar clusters CL1 included in the selected tree structure.

Then, data processing section 70 outputs only an outer line satisfying a condition as guide frame GD1, from created outer lines.

Figure 28A:
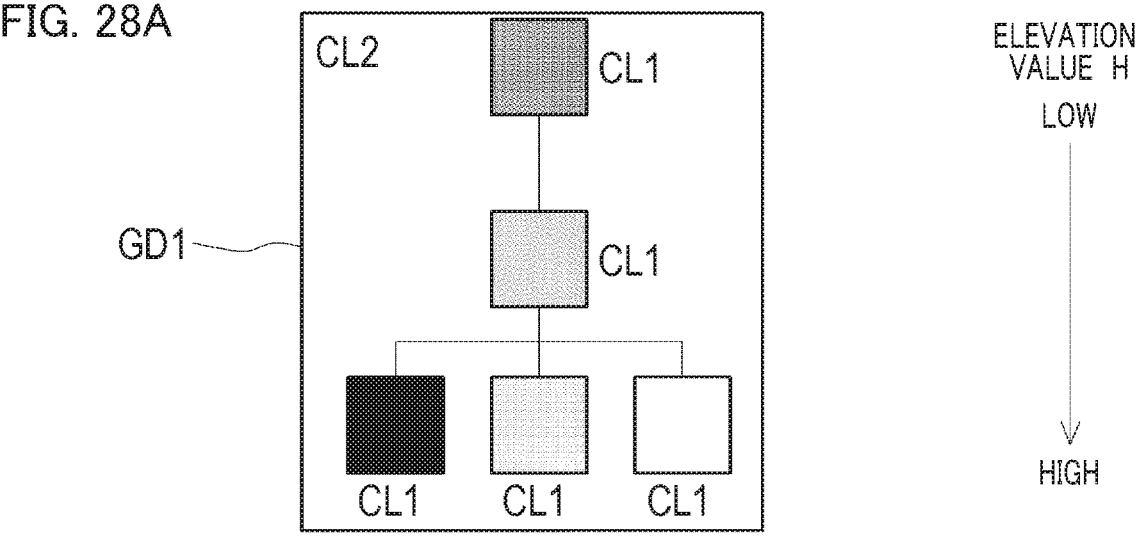
FIGS. 28A to 28C are diagrams illustrating example setting of a same-region cluster in hierarchical clustering, where

For example, as the condition for outputting as guide frame GD1, a condition of displaying only the outer line that is an outermost frame of grounded object C, as illustrated in FIG. 28A, may be selected. In the case of selecting such a condition, one guide frame GD1 entirely enclosing grounded object C is displayed on data display section 80, with respect to grounded object C in question.

Figure 28B:
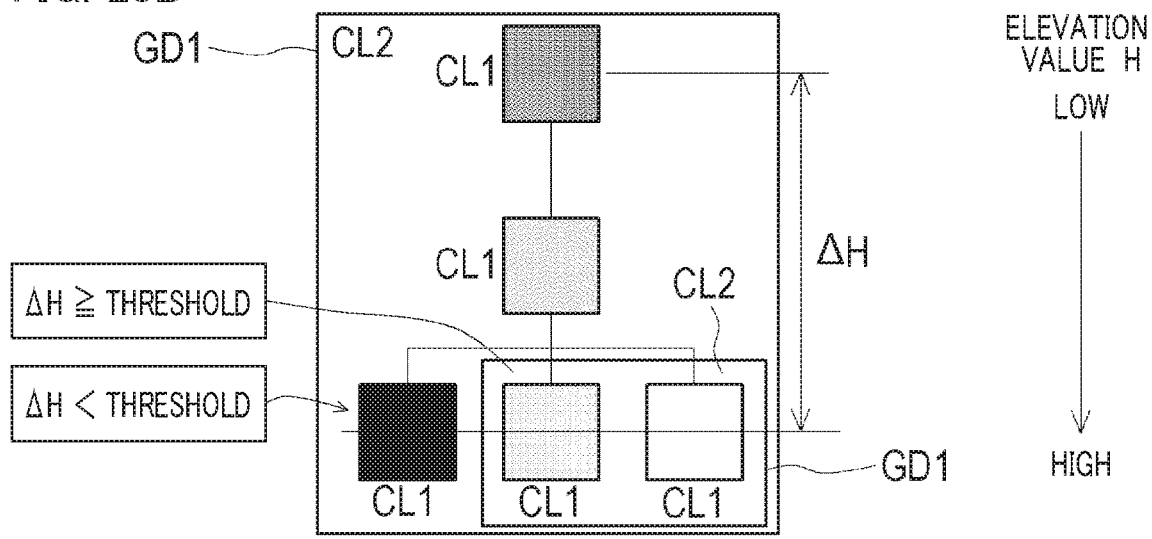

Furthermore, for example, as the condition for outputting as guide frame GD1, a condition of displaying, in addition to the outer line that is the outermost frame of grounded object C, an outer line (a small frame), among outer lines where the difference (difference ΔH) of elevation value H with respect to the "root" is at or greater than a threshold, of planar cluster CL1 with greatest elevation value H among the branches may be selected, as illustrated in FIG. 28B. In the case of selecting such a condition, first guide frame GD1 entirely enclosing grounded object C, and second guide frame GD1 included in first guide frame GD1 are displayed on data display section 80, and more detailed guide information GD that takes the three-dimensional shape of grounded object C into account is displayed.

Figure 28C:
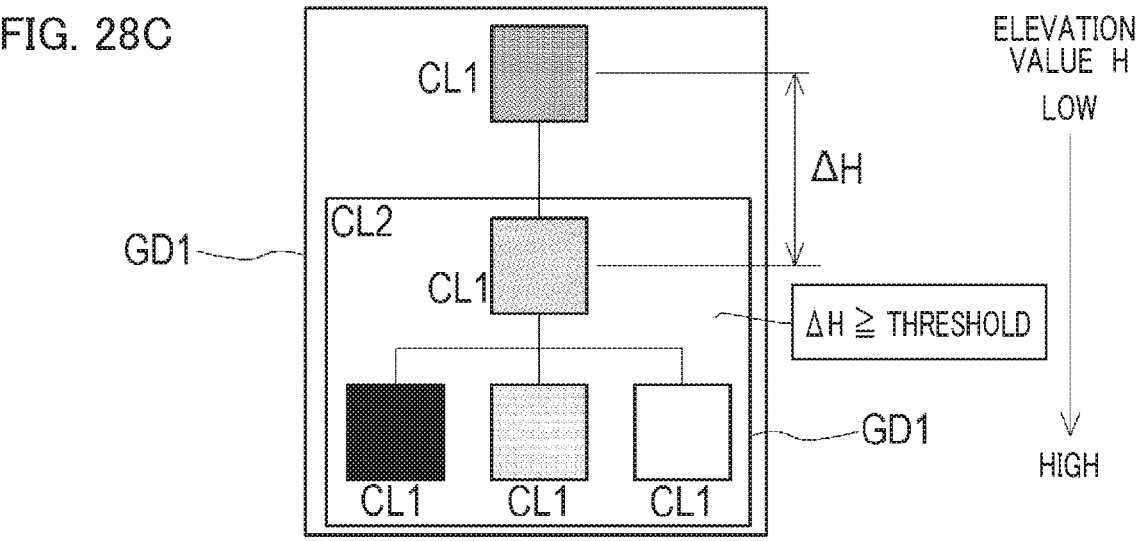

Furthermore, for example, as the condition for outputting as guide frame GD1, a condition of displaying, in addition to the outer line that is the outermost frame of grounded object C, all the outer lines (small frames) where the difference (difference ΔH) of elevation value H with respect to the "root" is at or greater than a threshold may be selected, as illustrated in FIG. 28C. Also in the case of selecting such a condition, first guide frame GD1 entirely enclosing grounded object C, and second guide frame GD1 included in first guide frame GD1 are displayed on data display section 80, and more detailed guide information GD that takes the three-dimensional shape of grounded object C into account is displayed.

The threshold regarding difference ΔH may be adjusted with respect to such display conditions. An operator may select the display condition for guide frame GD1 as appropriate to increase visibility of display of guide information GD.

That is, with guide information display apparatus 50, by creating guide frame GD1 on the basis of same-region cluster CL2, the three-dimensional shape of grounded object C may be taken into account, and guide frame GD1 more specifically expressing grounded object C may be created. Furthermore, with guide information display apparatus 50, guide frame GD1 collectively enclosing planar clusters CL1 existing in a same region may be created. That is, with guide information display apparatus 50, detailed and highly visible guide information GD may be presented.

As illustrated in FIG. 12, in the data processing by data processing section 70, a "synchronization process of point cloud data and camera image" is next performed (STEP-106).

As illustrated in FIGS. 5A and 5B, point cloud data P acquired in the XYZ coordinate system is transformed into coordinate values in the camera spatial coordinate system, is synchronized with (positioned on) image M taken by camera 61, and is output to data display section 80.

As illustrated in FIG. 12, in the data processing by data processing section 70, a "guide display process" is next performed (STEP-107).

Data processing section 70 creates guide information GD on the basis of information about created same-region cluster CL2, and outputs guide information GD to data display section 80.

Additionally, at the time of the "guide display process", "crane information" that is output from controller 34 of crane 1 is used. The "crane information" to be used here includes information about a length of telescopic boom 22, a luff-up angle, the working radius of crane 1, the weight of suspended load W, and the like.

A sequential flow of data processing by data processing section 70 has been described above. According to such a configuration, point data p on a side surface of a measurement target object does not have to be acquired, and guide information GD may be created by accurately grasping the three-dimensional shapes of suspended load W and grounded object C with a small amount of calculation. According to such a configuration, the amount of data calculation may be reduced, and thus, such a configuration is suitably used to grasp the shape of suspended load W or grounded object C in real time, and also allows use of data processing section 70 having a simple hardware configuration.

Next, contents of guide information GD will be described.

With guide information display apparatus 50, guide information GD is displayed by data display section 80. Guide information GD to be displayed by data display section 80 includes information about a specified position on ground surface F that is indicated by an operator, as illustrated in FIG. 8B.

Furthermore, guide information display apparatus 50 allows specification of suspended load W. When an operator specifies suspended load W on a screen, in the same manner as when specifying ground surface F, a plane (top surface) present at the specified position is set as representing the top surface of suspended load W. After specification of suspended load W, guide frame GD1 related to suspended load W and guide frame GD1 related to grounded object C are desirably displayed while being distinguished from each other by a change of the color, the thickness or the like of lines.

Pieces of information about specified positions of ground surface F and suspended load W are displayed by markers represented by figures such as circles.

Furthermore, guide information GD to be displayed by data display section 80 includes guide frame GD1 created by data processing section 70.

Data processing section 70 outputs guide frame GD1 on the basis of same-region cluster CL2 that is set. Additionally, with respect to guide frame GD1 of suspended load W, data processing section 70 may output, as guide frame GD1, a frame line that is outwardly offset from the outer line of suspended load W by a predetermined distance and that may include a margin to reliably avoid collision. Such guide frame GD1 is a frame display enclosing with line segments an estimated top surface (planar cluster CL1) of suspended load W and grounded object C.

Furthermore, guide information GD to be displayed by data display section 80 includes height information GD2 from reference height H0 to the bottom surface of suspended load W, and height information GD3 from reference height H0 to the top surface of grounded object C.

Height information GD2 of suspended load W is desirably displayed in an area that is independently provided at an easily visible position on the screen of data display section 80.

Guide information display apparatus 50 uses such a configuration to prevent height information GD2 of suspended load W and height information GD3 of grounded object C from being mistaken for each other.

Data processing section 70 calculates height information GD2 by subtracting a height of suspended load W from a top surface height of planar cluster CL1 that is estimated to be the top surface of suspended load W.

With guide information display apparatus 50, an operator inputs information about suspended load W (hereinafter, referred to as "suspended load information") in data processing section 70 in advance. Such input of "suspended load information" by an operator is performed through data input section 90. Data processing section 70 acquires the height of suspended load W by using the "suspended load information".

Guide information display apparatus 50 is configured to display height information GD3 of grounded object C inside guide frame GD1 enclosing grounded object C. Alternatively, in the case where guide frame GD1 is small, guide information display apparatus 50 is configured to display height information GD3 in a manner partially overlapping guide frame GD1.

Guide information display apparatus 50 clearly indicates a correspondence relationship between grounded object C and height information GD3 using such a configuration.

Furthermore, guide information display apparatus 50 is configured to change, by data processing section 70, the color of the line of guide frame GD1 according to elevation value H of planar cluster CL1 corresponding to guide frame GD1 in question.

Using such a configuration, guide information display apparatus 50 allows an operator to vaguely grasp the approximate elevation values (heights) of suspended load W and grounded object C by looking at guide frames GD1. Accordingly, guide information display apparatus 50 may more accurately present the heights of suspended load W and grounded object C.

Furthermore, guide information display apparatus 50 is configured to change, by data processing section 70, a font color of height information GD2 according to elevation value H of planar cluster CL1 corresponding to guide frame GD1.

Using such a configuration, guide information display apparatus 50 allows an operator to vaguely grasp the approximate elevation values (heights) of suspended load W and grounded object C by looking at height information GD2. Accordingly, guide information display apparatus 50 may more accurately present the heights of suspended load W and grounded object C.

Furthermore, traffic line information of suspended load W is included in the display of guide information GD performed by guide information display apparatus 50. The traffic line information of suspended load W includes working radius information GD4 of suspended load W, and axial line information GD5 of telescopic boom 22 of crane 1.

Working radius information GD4 is a rough indication of the traffic line of suspended load W at a time of swiveling of telescopic boom 22 from a present state, and suspended load W moves along an arc indicated in the form of working radius information GD4.

Furthermore, axial line information GD5 is a rough indication of the traffic line of suspended load W at a time of luffing-up or extension/retraction of telescopic boom 22 from a present state, and suspended load W moves along a straight line indicated in the form of working radius information GD4.

Guide information display apparatus 50 creates working radius information GD4 of suspended load W and axial line information GD5 of telescopic boom 22 on the basis of the "crane information".

Data processing section 70 calculates a working radius of crane 1 on the basis of the "crane information", and creates, and outputs as working radius information GD4, an arc indicating the working radius.

Furthermore, data processing section 70 calculates the axial line direction of telescopic boom 22 on the basis of the "crane information", and creates, and outputs as axial line information GD5, a straight line indicating the axial line direction.

Furthermore, guide information display apparatus 50 is configured to express lines displaying working radius information GD4 and axial line information GD5 by dotted lines while displaying lengths and gaps of the dotted lines using a length (hereinafter, referred to as a reference length) that is used as a rough indication. For example, in the case where the reference length is one meter, working radius information GD4 and axial line information GD5 are displayed to have lengths and gaps corresponding to one meter on ground surface F on a scale at the time, by changing the lengths and gaps of the dotted lines being displayed according to the size of suspended load region WA displayed on data display section 80.

Guide information display apparatus 50 is configured to allow an operator to sense the scale of suspended load W and grounded object C from guide information GD, by displaying the lengths and gaps of the dotted lines using the reference length (such as one meter).

Furthermore, data processing section 70 calculates a height of data acquisition section 60 on the basis of the "crane information", and also, calculates the size of suspended load region WA and a size of a display range of data display section 80, and changes the scale of the dotted lines (that is, sizes of the dotted lines and gaps) to be displayed as working radius information GD4 and axial line information GD5 according to calculation results.

Furthermore, display of guide information GD by guide information display apparatus 50 includes an alarm display for preventing suspended load W and grounded object C coming into contact with each other.

Data processing section 70 determines that there is a risk of contact, in a case where a horizontal distance between suspended load W and grounded object C projected on a horizontal plane is at or smaller than a predetermined threshold (such as one meter), and a distance in the vertical direction is at or smaller than a predetermined threshold (such as one meter).

Figure 29:
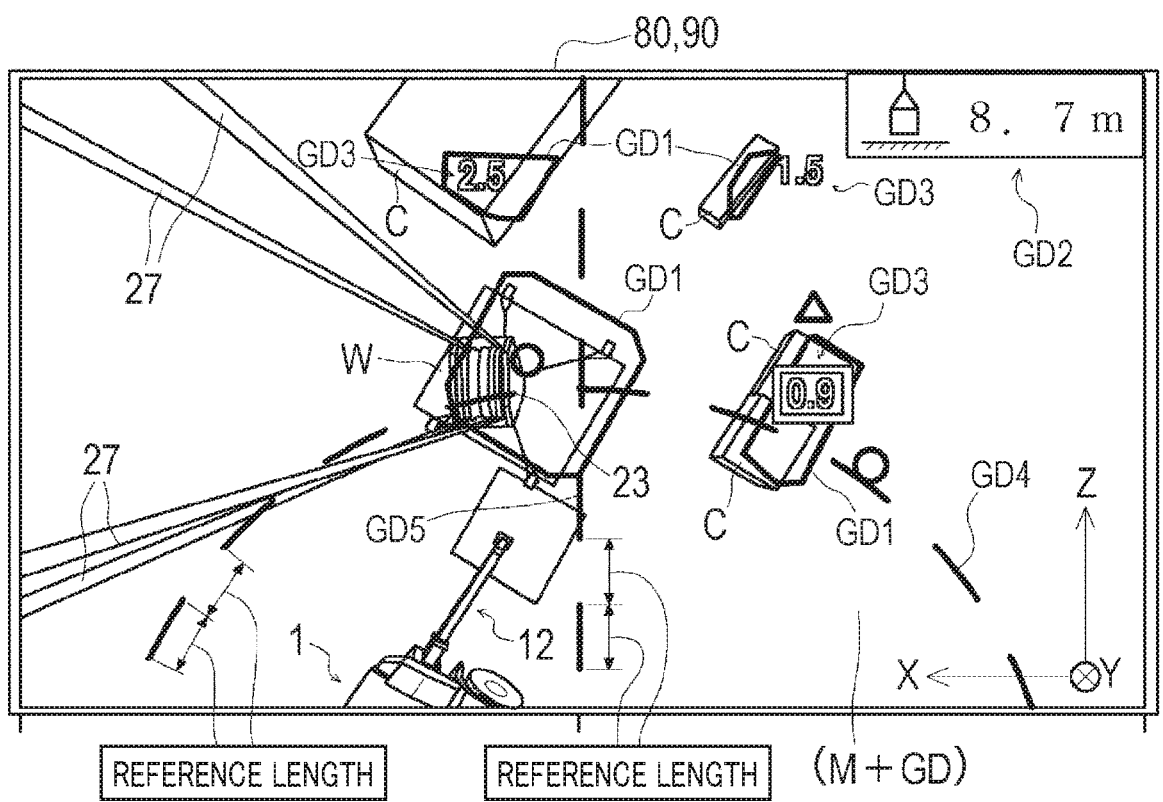
FIG. 29 is a schematic diagram illustrating an alarm display on the data display section.

At this time, as illustrated in FIG. 29, data processing section 70 outputs guide frame GD1 and height information GD2 of grounded object C while emphasizing guide frame GD1 and height information GD2 of grounded object C that possibly comes into contact with suspended load W. Alternatively, data processing section 70 outputs guide frame GD1 and height information GD2 of grounded object C while causing guide frame GD1 and height information GD2 of grounded object C to blink. With guide information display apparatus 50, guide frame GD1 and height information GD2 of grounded object C as alarm displays are output by data processing section 70 and are displayed on data display section 80 to thereby urge an operator to pay attention.

Figure 30:
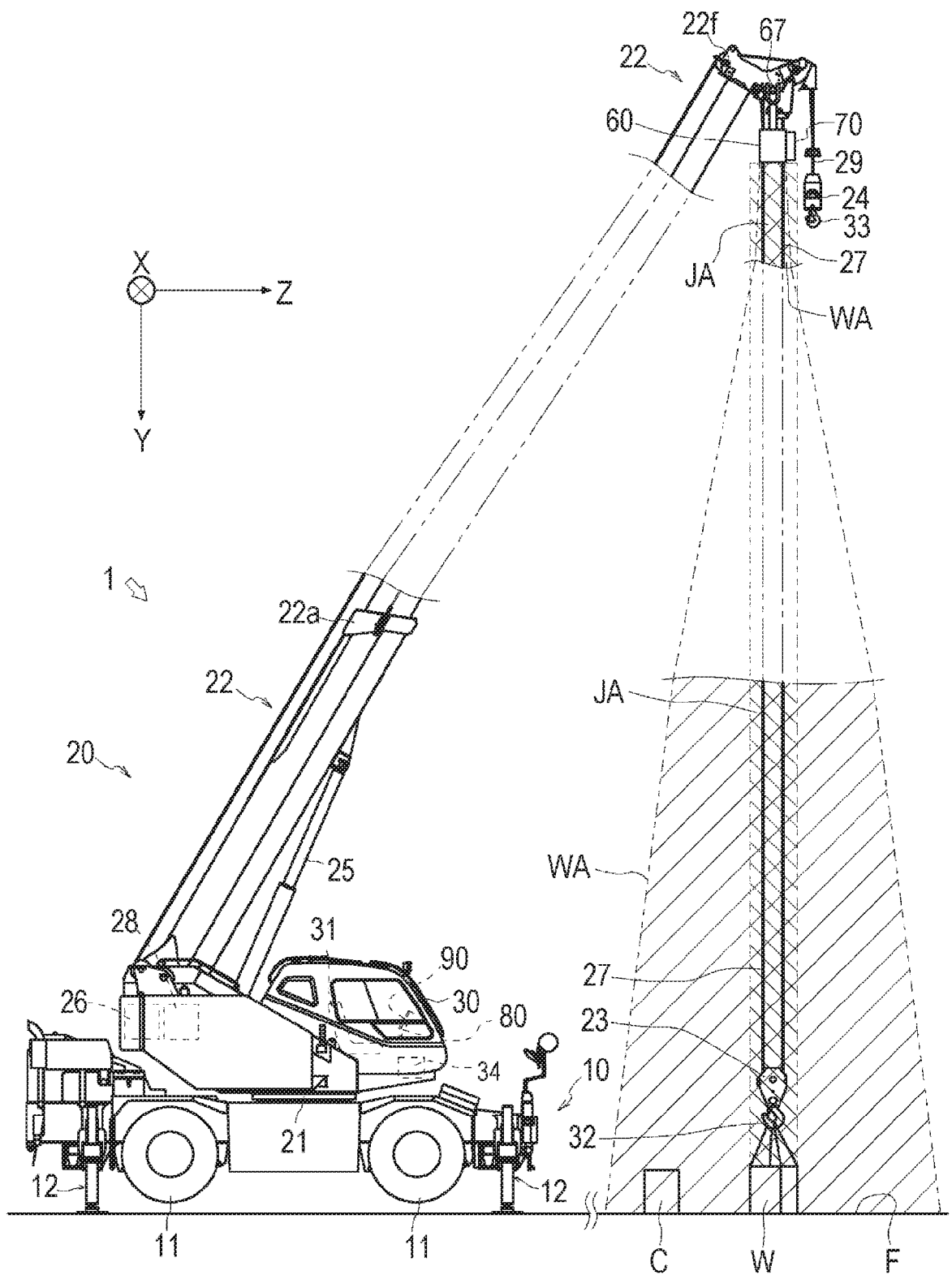
FIG. 30 is an explanatory diagram of a set state of an excluded region.

Furthermore, with guide information display apparatus 50, when creating guide information GD by data processing section 70, excluded region JA is set between suspended load W and top boom member 22f, as illustrated in FIG. 30. Data processing section 70 is configured to exclude point data p acquired in excluded region JA from targets of data processing.

Main wire rope 27 passes through excluded region JA. Guide information display apparatus 50 is configured to present more accurate and easily visible guide information GD, by not including main wire rope 27 as a target of creation of guide information GD (that is, the measurement target object). Additionally, excluded region JA is desirably set at a position at which a lower end height of excluded region JA is separate from the top surface of suspended load W by a predetermined distance, so as to prevent creation of guide frame GD1 of suspended load W from being affected.

With guide information display apparatus 50 having such a configuration, guide frames GD1 indicating the shapes, and guide information GD including height information GD2, GD3 indicating heights may be accurately presented to the operator of crane 1 with respect to suspended load W and grounded object C existing in the periphery of suspended load W. By using guide information display apparatus 50 having such a configuration, even in a state where the operator cannot directly view suspended load W, for example, the operator can perform work by crane 1 efficiently and safely on the basis of guide information GD presented by guide information display apparatus 50.

REFERENCE SIGNS LIST

1 Crane
50 Guide information display apparatus
60 Data acquisition section
70 Data processing section (means of data processing section)
80 Data display section
62 Laser scanner
P Point cloud data
p Point data
W Suspended load
C Grounded object
WA Suspended load region
CL1 Planar cluster
L1 Inter-point distance (of point data)
r1 Threshold
G1 Center of gravity
G2 Center of gravity
GD1 Guide frame

The invention claimed is:

1. A guide information display apparatus, comprising:
a data display section;
a data acquisition section that acquires image data of a suspended load region, and point cloud data, the image data being taken by a camera, the point cloud data being acquired by scanning an object from a top surface, the object including a suspended load and a grounded object in the suspended load region; and
a data processing section that creates a guide frame from a planar cluster resulting from clustering the point could data and causes the guide frame to be displayed on the data display section while superimposing the created guide frame on the object in the image data, wherein
the data processing section creates the guide frame by structuring the point could data into a hierarchy in a distance direction from the laser scanner, calculating a center of gravity of a plurality of points for which an inter-point distance is equal to or smaller than a threshold in the point could data belonging to a same layer, and deeming, to be on a same planar cluster, point data for which a distance with the center of gravity is equal to or smaller than a threshold.

2. The guide information display apparatus according to claim 1, wherein the data processing section
estimates a width of the planar cluster from an inter-point distance between two points that are most separate in a width direction of the planar cluster in planar view of the distance direction from the laser scanner, among the plurality of points that are deemed to be on the same planar cluster, and
estimates a depth of the planar cluster from an inter-point distance between two points that are most separate in a depth direction of the planar cluster.

3. A work machine, comprising the guide information display apparatus according to claim 2.

4. A work machine, comprising the guide information display apparatus according to claim 1.

5. A guide information display method, comprising:
a data acquisition step of acquiring image data of a suspended load region, and point cloud data, the image data being taken by a camera, the point cloud data being acquired by scanning an object from a top surface, the object including a suspended load and a grounded object in the suspended load region;
a data processing step of creating a guide frame by clustering the point could data; and
a data display step of causing the guide frame to be displayed on a data display section while superimposing the created guide frame on the object in the image data, wherein
the data processing step includes
a step of structuring the point could data into a hierarchy in a distance direction from the laser scanner and calculating a center of gravity of a plurality of pieces of the point cloud data which belong to a same layer and for which an inter-point distance is equal to or smaller than a threshold in the point could data, and
a step of creating the guide frame while deeming point data for which a distance with the center of gravity is equal to or smaller than a threshold to be on a same cluster.

6. The guide information display method according to claim 5, wherein
the step of calculating a center of gravity of the point cloud data in the data processing step repeats a step of recalculating a center of gravity with addition of point data for which a distance with the calculated center of gravity is equal to or smaller than a threshold.

7. The guide information display method according to claim 6, wherein
among the plurality of points that are deemed to be on the same planar cluster in the data processing step, a width of the cluster is estimated from an inter-point distance between two points that are most separate in a width direction of the planar cluster in planar view of the distance direction of the laser scanner from an inter-point distance between two points that are most separate in a width direction of the planar cluster in the data processing step, and a depth of the cluster is estimated from an inter-point distance between two points that are most separate in a depth direction of the cluster.

* * * * *